US012249275B2

(12) United States Patent
Kim et al.

(10) Patent No.: US 12,249,275 B2
(45) Date of Patent: Mar. 11, 2025

(54) ELECTRONIC DEVICE, DISPLAY DEVICE, AND DRIVING METHOD THEREOF

(71) Applicant: Samsung Display Co., Ltd., Yongin-si (KR)

(72) Inventors: Jihye Kim, Yongin-si (KR); Sangan Kwon, Yongin-si (KR); Soon-Dong Kim, Yongin-si (KR); Taehoon Kim, Yongin-si (KR); Seok Hwan Roh, Yongin-si (KR); Changnoh Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/613,133

(22) Filed: Mar. 22, 2024

(65) Prior Publication Data

US 2025/0029545 A1 Jan. 23, 2025

(30) Foreign Application Priority Data

Jul. 20, 2023 (KR) ........................ 10-2023-0094223

(51) Int. Cl.
*G09G 3/00* (2006.01)
*G09G 3/32* (2016.01)

(52) U.S. Cl.
CPC ....... *G09G 3/32* (2013.01); *G09G 2300/0861* (2013.01); *G09G 2310/0267* (2013.01);
(Continued)

(58) Field of Classification Search
CPC ............... G06F 1/1635; G06F 3/03545; G06F 1/1637; G06F 1/1643; G06F 1/1684; G06F 1/1698; G06F 1/266; G06F 3/0383; G06F 3/044; H02J 2310/22; H02J 50/10; H02J 50/80; H02J 7/00034; Y02B 90/20;
(Continued)

(56) References Cited

U.S. PATENT DOCUMENTS 11,049,451 B2 6/2021 Park et al.
11,328,661 B2 5/2022 Lee et al.
(Continued)

FOREIGN PATENT DOCUMENTS

CN 116229859 A 6/2023
KR 1020210013477 A 2/2021
(Continued)

*Primary Examiner* — Insa Sadio
(74) *Attorney, Agent, or Firm* — CANTOR COLBURN LLP

(57) ABSTRACT

A display device which includes a display panel that includes a first display area and a second display area, and a driving controller. During a multi-frequency mode, the driving controller drives the first display area by using a first driving frequency and drives the second display area by using a second driving frequency. During the multi-frequency mode, when the second driving frequency changes from a first frequency to a second frequency, the driving controller drives the first display area and the second display area during at least one frame by using a base frequency, drives the first display area and the second display area during at least one second frame by using an intermediate frequency between the base frequency and the second frequency, and then drives the first display area by using the first driving frequency and drives the second display area by using the second frequency.

25 Claims, 21 Drawing Sheets

(52) U.S. Cl.
CPC ................ *G09G 2330/021* (2013.01); *G09G 2340/0435* (2013.01)

(58) Field of Classification Search
CPC .... Y04S 20/00; G09G 2310/08; G09G 3/035; G09G 3/3266; G09G 3/3275
See application file for complete search history.

(56) References Cited

U.S. PATENT DOCUMENTS

| | | | |
|---|---|---|---|
| 2021/0035488 | A1 | 2/2021 | Seo et al. |
| 2023/0178003 | A1 | 6/2023 | Kim et al. |

FOREIGN PATENT DOCUMENTS

| | | | |
|---|---|---|---|
| KR | 1020210014259 | A | 2/2021 |
| KR | 1020210101627 | A | 8/2021 |
| KR | 1020230084400 | A | 6/2023 |

FIG. 10

| MFD_FREQ' | FREQ | Operation Mode | Descriptions |
|---|---|---|---|
| 0 | 120Hz | SFD | Full DE Operation |
| 2 | 60Hz | MFD_STEP1 | MF1 (60Hz) → FREQ |
| 3 | 40Hz | | |
| 4 | 30Hz | | |
| 5 | 24Hz | MFD_STEP2 | MF1 (60Hz) → MF2 (30Hz) → FREQ |
| 6 | 20Hz | | |
| 8 | 15Hz | | |
| 10 | 12Hz | | |
| 12 | 10Hz | | |
| 15 | 8Hz | MFD_STEP3 | MF1 (60Hz) → MF2 (30Hz) → MF3 (10Hz) → FREQ |
| 20 | 6Hz | | |
| 24 | 5Hz | | |
| 30 | 4Hz | | |
| 40 | 3Hz | | |
| 60 | 2Hz | | |
| 120 | 1Hz | | |

ELECTRONIC DEVICE, DISPLAY DEVICE, AND DRIVING METHOD THEREOF

CROSS-REFERENCE TO RELATED APPLICATIONS

This application claims priority to Korean Patent Application No. 10-2023-0094223, filed on Jul. 20, 2023, and all the benefits accruing therefrom under 35 U.S.C. § 119, the content of which in its entirety is herein incorporated by reference.

BACKGROUND

Field

Embodiments of the present disclosure described herein relate to a display device.

Description of the Related Art

A display device may include pixels connected to data lines and scan lines. Each of the pixels may include a light emitting element and a pixel circuit for controlling the light emitting element. The pixel circuit may provide the light emitting element with a current, and the amount of the current may correspond to a data signal. In this case, a light having luminance corresponding to the amount of current flowing through the light emitting element may be generated.

Techniques for improving the quality of image to be displayed in the display device are desired. Techniques for reducing power consumption of the display device are desired.

SUMMARY

Embodiments of the present disclosure provide a display device and a driving method capable of operating by using various driving frequencies.

Embodiments of the present disclosure provide an electronic device including a display device capable of operating by using various driving frequencies under control of a processor.

According to an embodiment, a display device includes a display panel that includes a first display area and a second display area, and a driving controller that receives an image signal and a control signal and outputs an image data signal to be provided to the display panel. During a multi-frequency mode, the driving controller drives the first display area by using a first driving frequency and drives the second display area by using a second driving frequency different from the first driving frequency. During the multi-frequency mode, when the second driving frequency changes from a first frequency to a second frequency, the driving controller drives the first display area and the second display area during at least one frame by using a base frequency, drives the first display area and the second display area during at least one second frame by using an intermediate frequency between the base frequency and the second frequency, and, during at least one third frame, drives the first display area by using the first driving frequency and drives the second display area by using the second frequency.

In an embodiment, the driving controller may receive a multi-frequency enable signal indicating the multi-frequency mode, a driving frequency signal indicating a frequency of the second display area for each of a previous frame and a current frame, and a start location signal indicating a start location of the second display area for each of the previous frame and the current frame.

In an embodiment, when the multi-frequency enable signal is at a first level, the driving controller may operate in the multi-frequency mode.

In an embodiment, when the driving frequency signal of the current frame is different from the driving frequency signal of the previous frame or when the start location signal of the current frame is different from the start location signal of the previous frame, during the at least one frame, the driving controller may drive the first display area and the second display area by using the base frequency.

In an embodiment, when the driving frequency signal of the current frame is smaller than or equal to a first value, the driving controller may drive the first display area and the second display area during a first intermediate frame, by using a first intermediate frequency between the base frequency and the second frequency and, during the at least one third frame, may drive the first display area by using the first driving frequency and drive the second display area by using the second frequency.

In an embodiment, when the driving frequency signal of the current frame is greater than the first value and is smaller than or equal to a second value, the driving controller may drive the first display area and the second display area during the first intermediate frame by using the first intermediate frequency, may drive the first display area and the second display area during a second intermediate frame continuous to the first intermediate frame, by using a second intermediate frequency between the first intermediate frequency and the second frequency, and, during the at least one third frame, may drive the first display area by using the first driving frequency and drive the second display area by using the second frequency.

In an embodiment, when the driving frequency signal of the current frame is greater than a second value greater than the first value, the driving controller may drive the first display area and the second display area during the first intermediate frame by using the first intermediate frequency, may drive the first display area and the second display area during a second intermediate frame continuous to the first intermediate frame, by using the second intermediate frequency, may drive the first display area and the second display area during a third intermediate frame continuous to the second intermediate frame, by using a third intermediate frequency between the second intermediate frequency and the second frequency, and, during the at least one third frame, may drive the first display area by using the first driving frequency and drive the second display area by using the second frequency.

In an embodiment, when the driving frequency signal of the current frame is the same as the driving frequency signal of the previous frame and when the start location signal of the current frame is different from the start location signal of the previous frame, during at least one second frame, the driving controller may drive the first display area and the second display area during by using the base frequency according to the multi-frequency mode.

In an embodiment, the first driving frequency may be higher than or equal to the base frequency.

According to an embodiment, a method of driving a display device includes receiving an image signal corresponding to a first display area and a second display area of a display panel, a multi-frequency enable signal indicating a multi-frequency mode, a driving frequency signal indicating a frequency of the second display area, and a start location signal indicating a start location of the second display area for each of a previous frame and a current frame, comparing the driving frequency signal of the current frame with the driving frequency signal of the previous frame and comparing the start location signal of the current frame with the start location signal of the previous frame while the multi-frequency enable signal indicates the multi-frequency mode, driving the first display area and the second display area by using a base frequency, during at least one frame, based on determining the driving frequency signal of the current frame is different from the driving frequency signal of the previous frame or determining the start location signal of the current frame is different from the start location signal of the previous frame, and driving the first display area by using a first driving frequency and driving the second display area by using a second driving frequency corresponding to the driving frequency signal of the current frame.

In an embodiment, the method may further include comparing the driving frequency signal of the current frame with a first value when the driving frequency signal of the current frame is different from the driving frequency signal of the previous frame, and driving the display panel when the driving frequency signal of the current frame is smaller than or equal to the first value. The driving of the display panel when the driving frequency signal of the current frame is smaller than or equal to the first value may include driving the first display area and the second display area by using a first intermediate frequency between the base frequency and the second driving frequency, and driving the first display area by using the first driving frequency and driving the second display area by the second driving frequency.

In an embodiment, the method may further include comparing the driving frequency signal of the current frame with a second value greater than the first value, and driving the display panel when the driving frequency signal of the current frame is smaller than or equal to the second value. The driving of the display panel when the driving frequency signal of the current frame is smaller than or equal to the second value may include driving the first display area and the second display area by using the first intermediate frequency, driving the first display area and the second display area by using a second intermediate frequency between the first intermediate frequency and the second driving frequency, and driving the first display area by using the first driving frequency and driving the second display area by the second driving frequency.

In an embodiment, the method may further include comparing the driving frequency signal of the current frame with a second value greater than the first value and driving the display panel when the driving frequency signal of the current frame is greater than the second value. The driving of the display panel when the driving frequency signal of the current frame is greater than the second value may include driving the first display area and the second display area by using the first intermediate frequency during a first intermediate frame, driving the first display area and the second display area by using the second intermediate frequency during a second intermediate frame continuous to the first intermediate frame, driving the first display area and the second display area during a third intermediate frame continuous to the second intermediate frame, by using a third intermediate frequency between the second intermediate frequency and the second driving frequency, and driving the first display area by using the first driving frequency and driving the second display area by the second driving frequency.

In an embodiment, the method may further include driving the first display area and the second display area during at least one second frame according to the multi-frequency mode when the driving frequency signal of the current frame is the same as the driving frequency signal of the previous frame and when the start location signal of the current frame is different from the start location signal of the previous frame.

In an embodiment, the second driving frequency may be lower than the first driving frequency.

In an embodiment, the first driving frequency may be higher than or equal to the base frequency.

According to an embodiment, an electronic device includes a processor that provides an image signal, a multi-frequency enable signal, and a driving frequency signal, and a display device that receives the image signal, the multi-frequency enable signal, and the driving frequency signal and displays an image. The display device includes a display panel that includes a first display area and a second display area, and a driving controller that receives the image signal, the multi-frequency enable signal, and the driving frequency signal and outputs an image data signal to be provided to the display panel. During a multi-frequency mode, the driving controller drives the first display area by using a first driving frequency and drives the second display area by using a second driving frequency different from the first driving frequency. While the multi-frequency enable signal indicates the multi-frequency mode, when the second driving frequency corresponding to the driving frequency signal changes from a first frequency to a second frequency, the driving controller drives the first display area and the second display area during at least one frame by using a base frequency, drives the first display area and the second display area during at least one second frame by using an intermediate frequency between the base frequency and the second frequency, and, during at least one third frame, drives the first display area by using the first driving frequency and drives the second display area by using the second frequency.

In an embodiment, when the driving frequency signal of a current frame is smaller than or equal to a first value, the driving controller may drive the first display area and the second display area during a first intermediate frame by using a first intermediate frequency between the base frequency and the second frequency, and, during the at least one third frame, may drive the first display area by using the first driving frequency and drive the second display area by using the second frequency.

In an embodiment, when the driving frequency signal of the current frame is greater than the first value and is smaller than or equal to a second value, the driving controller may drive the first display area and the second display area during the first intermediate frame by using the first intermediate frequency, may drive the first display area and the second display area during a second intermediate frame continuous to the first intermediate frame, by using a second intermediate frequency between the first intermediate frequency and the second frequency, and, during the at least one third frame, may drive the first display area by using the first driving frequency and drive the second display area by using the second frequency.

In an embodiment, the processor may provide the driving frequency signal for each of a previous frame and a current frame, and the processor may further provide a start location signal for each of the previous frame and the current frame. When the driving frequency signal of the current frame is the same as the driving frequency signal of the previous frame and when the start location signal of the current frame is different from the start location signal of the previous frame, the driving controller may drive the first display area and the second display area during at least one second frame according to the multi-frequency mode.

According to an embodiment, an electronic device may include a processor that provides an image signal, a multi-frequency enable signal, a driving frequency signal, and a start location signal, and a display device that receives the image signal, the multi-frequency enable signal, the driving frequency signal, and the start location signal and displays an image. The display device may include a display panel, and a driving controller that divides and drives the display panel into a first display area and a second display area in response to the start location signal while the multi-frequency enable signal indicates a multi-frequency mode. The start location signal may indicate a start location of the second display area of the display panel. In response to the driving frequency signal, the driving controller may drive the first display area by using a first driving frequency and may drive the second display area by using a second driving frequency different from the first driving frequency.

In an embodiment, while the multi-frequency enable signal indicates the multi-frequency mode, when the second driving frequency corresponding to the driving frequency signal changes from a first frequency to a second frequency, the driving controller may drive the first display area and the second display area during at least one frame by using a base frequency, may then drive the first display area and the second display area during at least one frame by using an intermediate frequency between the base frequency and the second frequency, and may then drive the first display area by using the first driving frequency and drive the second display area by using the second frequency.

In an embodiment, when the driving frequency signal of a current frame is smaller than or equal to a first value, the driving controller may drive the first display area and the second display area during a first intermediate frame by using a first intermediate frequency between the base frequency and the second frequency, and may then drive the first display area by using the first driving frequency and drive the second display area by using the second frequency.

In an embodiment, when the driving frequency signal of the current frame is greater than the first value and is smaller than or equal to a second value, the driving controller may drive the first display area and the second display area during the first intermediate frame by using the first intermediate frequency, may then drive the first display area and the second display area during a second intermediate frame continuous to the first intermediate frame, by using a second intermediate frequency between the first intermediate frequency and the second frequency, and may then drive the first display area by using the first driving frequency and drive the second display area by using the second frequency.

In an embodiment, when the driving frequency signal of a current frame is the same as the driving frequency signal of a previous frame and when the start location signal of the current frame is different from the start location signal of the previous frame, the driving controller may drive the first display area and the second display area during at least one frame by using the base frequency.

BRIEF DESCRIPTION OF THE DRAWINGS

The above and other objects and features of the present disclosure will become apparent by describing in detail embodiments thereof with reference to the accompanying drawings.

FIG. 10 is a diagram illustrating operation modes according to a driving frequency signal of a current frame.

DETAILED DESCRIPTION

Figure 1:
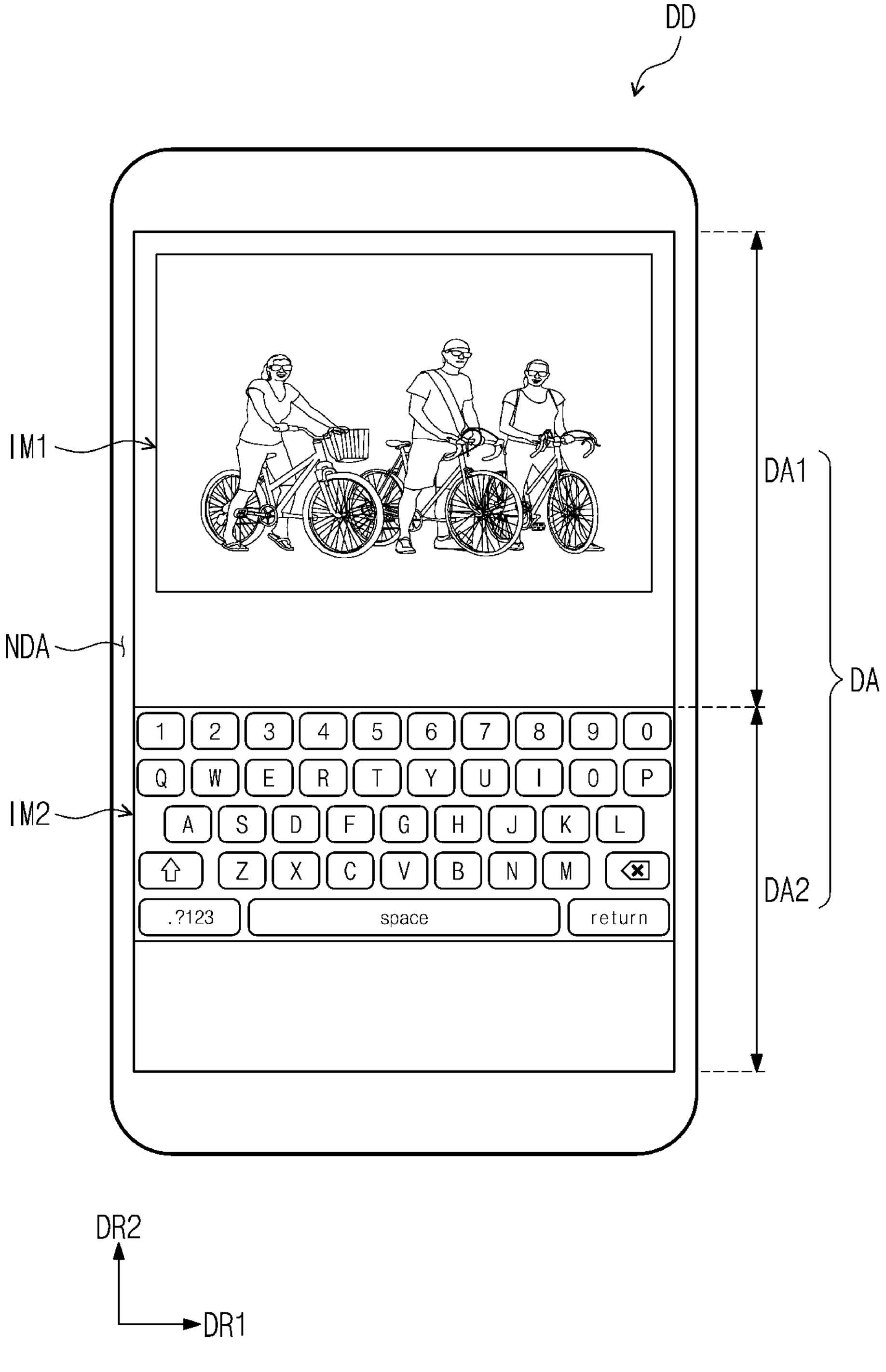
FIG. 1 illustrates a display device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numerals/signs refer to the same components. In drawings, the thickness, ratio, and dimension of components on are exaggerated for effectiveness of description of technical contents. The expression "and/or" includes one or more combinations which associated components are capable of defining.

Although the terms "first", "second", and the like may be used to describe various components, the components should not be construed as being limited by the terms. The terms are used to distinguish one component from another component. For example, without departing from the scope and spirit of embodiments of the present disclosure, a first component may be referred to as a "second component", and similarly, the second component may be referred to as the "first component". The articles "a", "an", and "the" are singular in that they have a single referent, but the use of the singular form in the specification should not preclude the presence of more than one referent.

The terms "under", "beneath", "on", "above", and the like are used to describe a relationship between components illustrated in a drawing. The terms are relative and are described with respect to a direction indicated in the drawing.

It will be understood that the terms "include", "comprise", "have", and the like specify the presence of features, numbers, steps, operations, elements, or components, described in the specification, or a combination thereof, not precluding the presence or additional possibility of one or more other features, numbers, steps, operations, elements, or components or a combination thereof. Example flowcharts described herein correspond to methods supported by embodiments of the present disclosure.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings. As described herein, embodiments of the present disclosure support increasing a driving frequency of a display device to improve the quality of image to be displayed in the display device. In some aspects, embodiments of the present disclosure support decreasing the driving frequency of the display device to reduce power consumption of the display device.

FIG. 1 illustrates a display device according to an embodiment of the present disclosure.

Referring to FIG. 1, a portable terminal is illustrated as an example of a display device DD according to an embodiment of the present disclosure. The portable terminal may include a tablet PC, a smartphone, a personal digital assistant (PDA), a portable multimedia player (PMP), a game console, a wristwatch-type electronic device, or the like. However, the present disclosure is not limited thereto. The present disclosure may be used for small and medium-sized electronic devices such as, for example, a personal computer, a notebook computer, a kiosk, a car navigation unit, and a camera, in addition to large-sized electronic equipment such as, for example, a television or an outside billboard. The examples described herein are provided as example embodiments, and aspects of the present disclosure support applying features of the display device DD to any other electronic device(s) without departing from the concept of the present disclosure.

As illustrated in FIG. 1, a display surface on which a first image IM1 and a second image IM2 are displayed is parallel to a plane defined by a first direction DR1 and a second direction DR2. The display device DD includes a plurality of areas that are distinguished from each other on the display surface. The display surface includes a display area DA in which the first image IM1 and the second image IM2 are displayed, and a non-display area NDA adjacent to the display area DA. The non-display area NDA may be referred to as a bezel area. As an example, the display area DA may be in the shape of a quadrangle. The non-display area NDA surrounds the display area DA. Although not illustrated, as an example, the display device DD may include a partially curved shape.

The display area DA of the display device DD includes a first display area DA1 and a second display area DA2. In a specific application program, the first image IM1 may be displayed in the first display area DA1, and the second image IM2 may be displayed in the second display area DA2. For example, the first image IM1 may be an image (e.g., a video image) with a fast change period, and the second image IM2 may be an image (e.g., a still image such as, for example, a photo or text information) with a long change period.

An operation mode of the display device DD may be a single frequency mode and a multi-frequency mode. For example, the display device DD may operate according to the single frequency mode or the multi-frequency mode. During the single frequency mode, the display device DD may drive both the first display area DA1 and the second display area DA2 by using a base frequency. During the multi-frequency mode, the display device DD according to an embodiment may drive the first display area DA1, in which the first image IM1 is displayed, by using a first driving frequency and may drive the second display area DA2, in which the second image IM2 is displayed, by using a second driving frequency. In an embodiment, the first driving frequency may be higher than or equal to the base frequency. In an embodiment, the second driving frequency may be lower than the first driving frequency, and in some examples, greater than the base frequency. The display device DD may reduce power consumption by decreasing the driving frequency of the second display area DA2.

The size of each of the first display area DA1 and the second display area DA2 may be determined in advance and may be changed by an application program (e.g., a program executed at the display device DD).

In an embodiment, when the still image is displayed in the first display area DA1 and the video image is displayed in the second display area DA2, the first display area DA1 may be driven by using a frequency lower than the base frequency, and the second display area DA2 may be driven by using a frequency higher than or equal to the base frequency.

In an embodiment, the display area DA may be divided into three or more display areas; in this example case, a driving frequency of each of the three or more display areas may be determined depending on a type (e.g., a still image or a video image) of an image that is displayed therein. That is, for example, the display device DD may drive each of the three or more display areas using respective driving frequencies determined by the display device DD based on the types of images displayed in the three or more display areas.

Figure 2A:
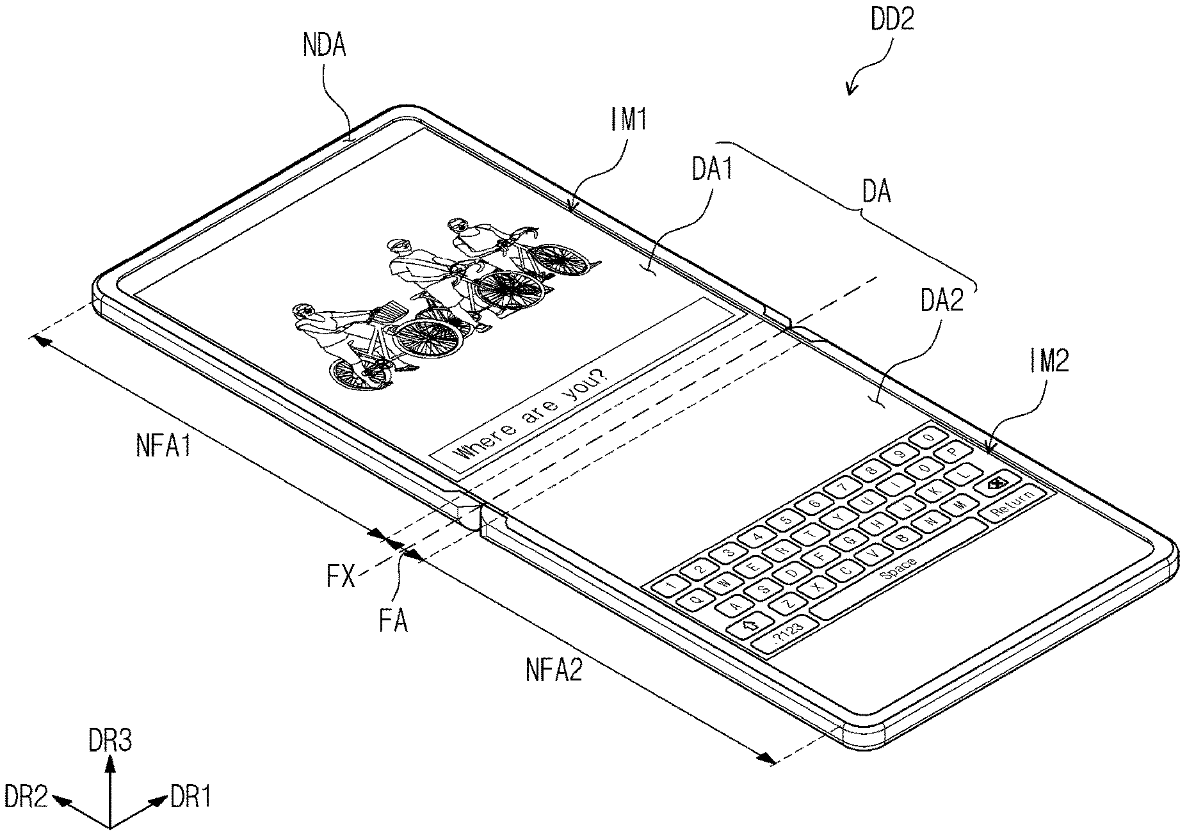
FIGS. 2A and 2B are perspective views of a display device according to an embodiment of the present disclosure.
Figure 2B:
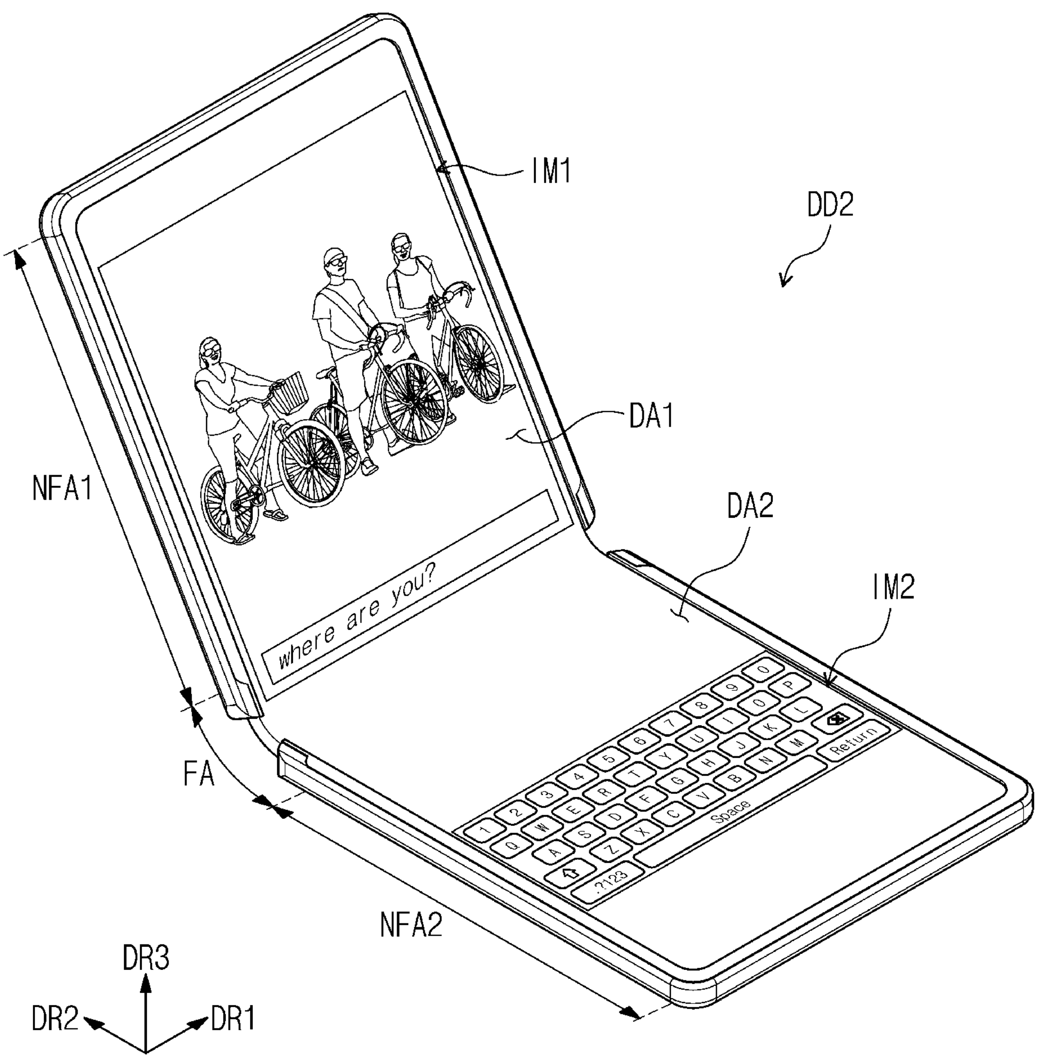

FIGS. 2A and 2B are perspective views of a display device DD2 according to an embodiment of the present disclosure. FIG. 2A illustrates an unfolded state of the display device DD2, and FIG. 2B illustrates a folded state of the display device DD2.

As illustrated in FIGS. 2A and 2B, the display device DD2 includes the display area DA and the non-display area NDA. The display device DD2 may display an image through the display area DA. The display area DA may include the plane defined by the first direction DR1 and the second direction DR2, with the display device DD2 unfolded. A thickness direction of the display device DD2 may be parallel to a third direction DR3 intersecting the first direction DR1 and the second direction DR2. Accordingly, front surfaces (or upper surfaces) and bottom surfaces (or lower surfaces) of members constituting the display device DD2 may be defined with respect to the third direction DR3. The non-display area NDA may be referred to as a bezel area. As an example, the display area DA may be in the shape of a quadrangle. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as "inward-folding". The described folding is an example, and the operation of the display device DD2 is not limited thereto.

In an embodiment of the present disclosure, when the display device DD2 is folded, the first non-folding area NFA1 and the second non-folding area NFA2 may be opposite to each other (e.g., face away from each other). Accordingly, for example, in a state where the display device DD2 is folded, the first non-folding area NFA1 may be exposed to the outside, which may be referred to as "outward-folding".

In some embodiments, the display device DD2 may support one of inward-folding or outward-folding of the display device DD2. Alternatively, the display device DD2 may support inward-folding and outward-folding of the display device DD2. In this case, the same area of the display device DD2, for example, the folding area FA may be foldable inward or foldable outward (or may be foldable inwardly and outwardly). Alternatively or additionally, a partial area of the display device DD2 may be foldable inward, and the remaining area thereof may be foldable outward.

One folding area and two non-folding areas are illustrated in the examples of FIGS. 2A and 2B, but the number of folding areas and the number of non-folding areas are not limited thereto. For example, the display device DD2 may include a plurality of non-folding areas, the number of which is more than two, and a plurality of folding areas, the number of which is more than two. In some aspects, each of the plurality of folding areas may be interposed between non-folding areas adjacent to each other from among the plurality of non-folding areas.

An example in which the folding axis FX is parallel to the minor axis of the display device DD2 is illustrated in FIGS. 2A and 2B. However, the present disclosure is not limited thereto. For example, the folding axis FX may extend in a direction parallel to the major axis of the display device DD2, for example, the second direction DR2.

An example in which the first non-folding area NFA1, the folding area FA, and the second non-folding area NFA2 are sequentially disposed in the second direction DR2 is illustrated in FIGS. 2A and 2B. However, the present disclosure is not limited thereto. For example, the first non-folding area NFA1, the folding area FA, and the second non-folding area NFA2 may be sequentially disposed in the first direction DR1.

The plurality of display areas DA1 and DA2 may be defined in the display area DA of the display device DD2. Two display areas DA1 and DA2 are illustrated in FIG. 2A as an example, but the number of display areas of the display device DD2 is not limited thereto.

The plurality of display areas may include the first display area DA1 and the second display area DA2. For example, the first display area DA1 may be an area where the first image IM1 is displayed, and the second display area DA2 may be an area in which the second image IM2 is displayed. For example, the first image IM1 may be a video image, and the second image IM2 may be a still image.

The display device DD2 according to an embodiment may operate differently depending on an operation mode. The operation mode of the display device DD2 may include the single frequency mode and the multi-frequency mode. During the single frequency mode, the display device DD2 may drive both the first display area DA1 and the second display area DA2 by using the base frequency. During the multi-frequency mode, the display device DD2 according to an embodiment may drive the first display area DA1, in which the first image IM1 is displayed, by using the first driving frequency and may drive the second display area DA2, in which the second image IM2 is displayed, by using the second driving frequency. In an embodiment, the first driving frequency may be higher than or equal to the base frequency, and the second driving frequency may be lower than the first driving frequency. In an embodiment, the second driving frequency may be higher than the base frequency.

The size of each of the first display area DA1 and the second display area DA2 may be determined in advance and may be changed by an application program. In an embodiment, the first display area DA1 may correspond to the first non-folding area NFA1, and the second display area DA2 may correspond to the second non-folding area NFA2. In some aspects, a first portion of the folding area FA may correspond to (e.g., be included in) the first display area DA1, and a second portion of the folding area FA may correspond to (e.g., be included in) the second display area DA2.

In an embodiment, the entire folding area FA may correspond to one of the first display area DA1 and the second display area DA2. For example, the entire folding area FA may be included in one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, for example, the size of the second display area DA2 may be larger than the size of the first display area DA1.

In an embodiment, the first display area DA1 may correspond to the first non-folding area NFA1, the folding area FA, and the first portion of the second non-folding area NFA2, and the second display area DA2 may correspond to the second portion of the second non-folding area NFA2. That is, for example, the size of the first display area DA1 may be larger than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

An example in which the display device DD2 has one folding area is illustrated in FIGS. 2A and 2B as an example of a display device. However, the present disclosure is not limited thereto. For example, aspects of the present disclosure may also be applied to a display device having two or more folding areas, a rollable display device, or a slideable display device.

Figure 3:
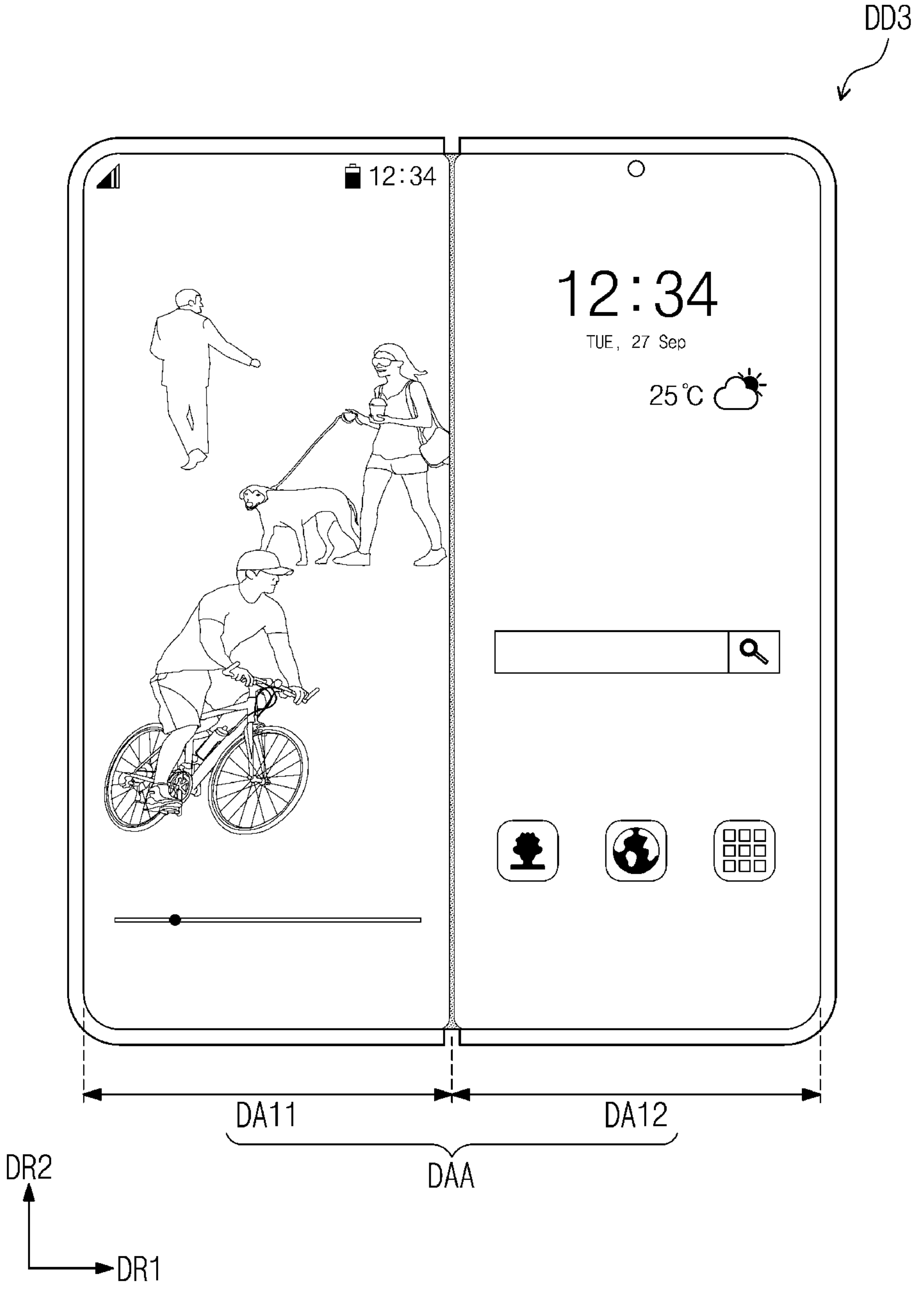
FIG. 3 is a diagram illustrating a display device according to an embodiment of the present disclosure.

FIG. 3 is a diagram illustrating a display device DD3 according to an embodiment of the present disclosure.

Referring to FIG. 3, a display area DAA of the display device DD3 includes a first display area DA11 and a second display area DA12.

The operation mode of the display device DD3 may include the single frequency mode and the multi-frequency mode. During the single frequency mode, the display device DD3 may drive both the first display area DA11 and the second display area DA12 by using the base frequency. During the multi-frequency mode, the display device DD3 according to an embodiment may drive the first display area DA11, in which the video image is displayed, by using the first driving frequency and may drive the second display area DA12, in which the still image is displayed, by using the second driving frequency. In an embodiment, the first driving frequency may be higher than or equal to the base frequency, and the second driving frequency may be lower than the first driving frequency. In an embodiment, the second driving frequency may be higher than the base frequency. The display device DD3 may reduce power consumption by decreasing the driving frequency of the second display area DA12.

Examples are described herein with reference to the example display device DD illustrated in FIG. 1. However, aspects of the present disclosure may be identically applied to the display device DD2 illustrated in FIGS. 2A and 2B and the display device DD3 illustrated in FIG. 3.

Figure 4A:
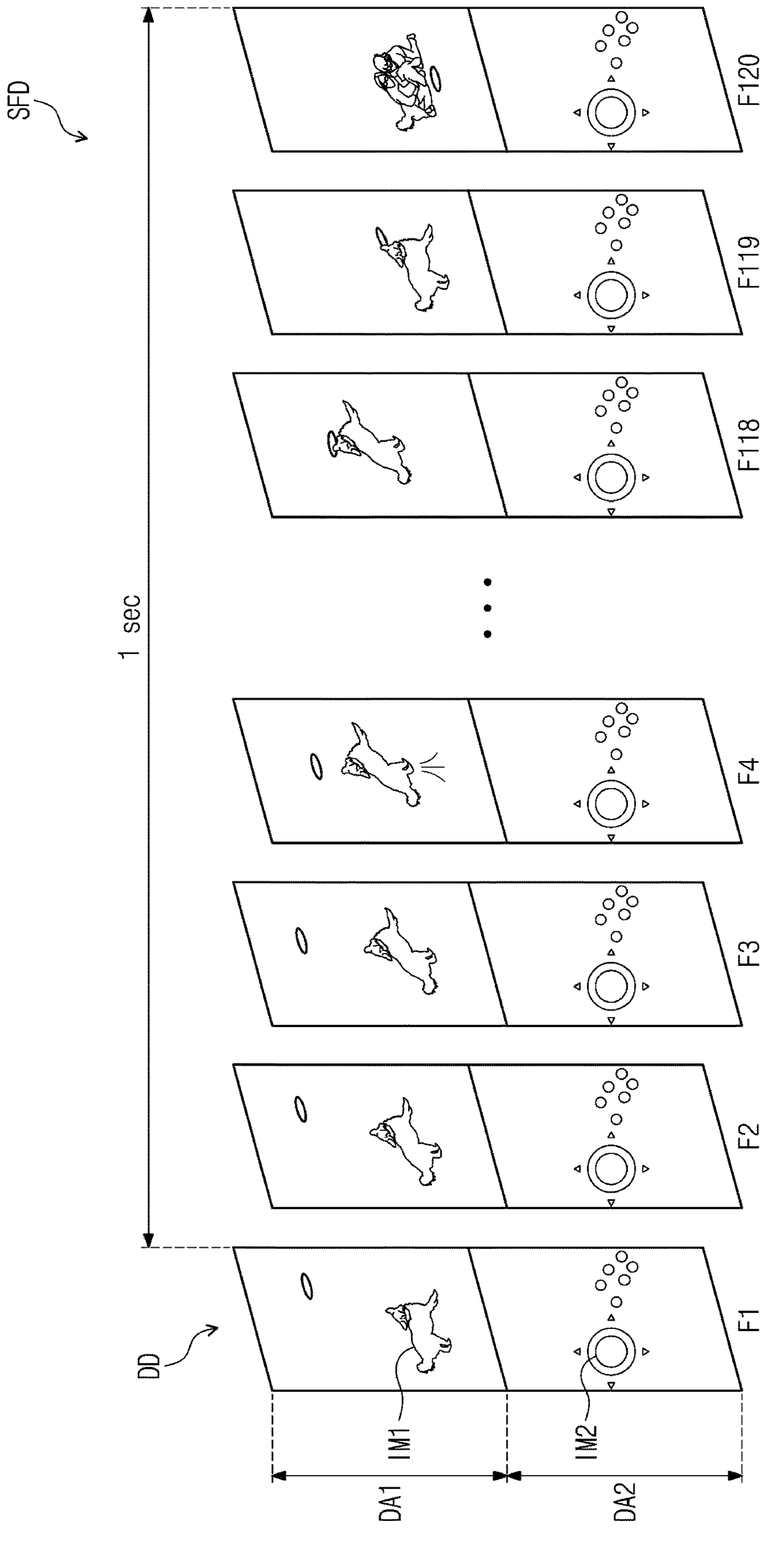
FIG. 4A is a diagram for describing an operation of a display device in a single frequency mode.
Figure 4B:
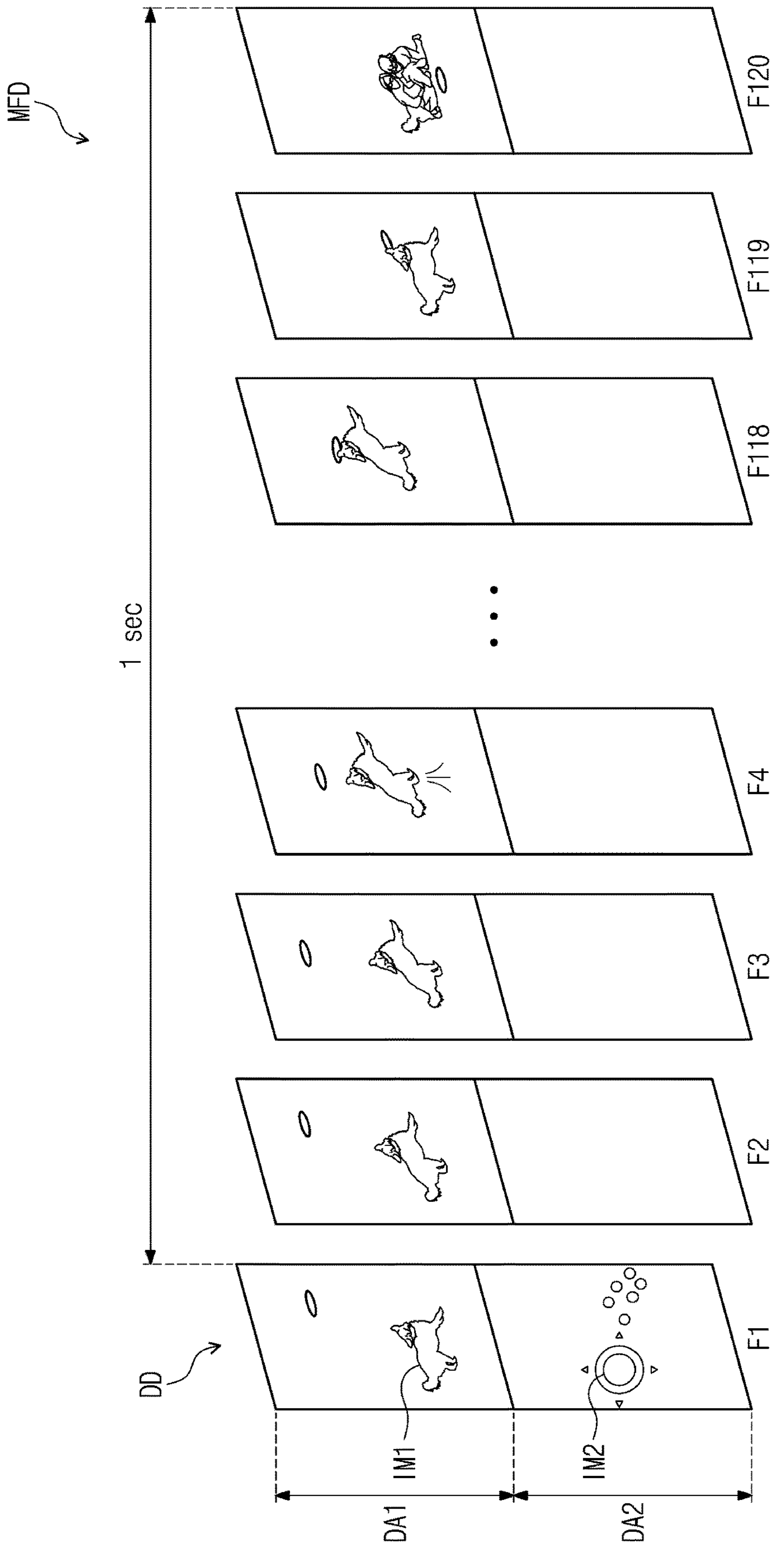
FIG. 4B is a diagram for describing an operation of a display device in a multi-frequency mode.

FIG. 4A is a diagram for describing an operation of a display device in a single frequency mode SFD in accordance with example aspects of the present disclosure. FIG. 4B is a diagram for describing an operation of a display device in a multi-frequency mode MFD in accordance with example aspects of the present disclosure.

Referring to FIG. 4A, the first image IM1 that is displayed in the first display area DA1 may be a video image, and the second image IM2 that is displayed in the second display area DA2 may be an image (e.g., a game control keypad image) with a long change period or a still image. The first image IM1 displayed in the first display area DA1 and the second image IM2 displayed in the second display area DA2 are illustrated in FIG. 4A as an example, and various images may be displayed in the display device DD.

In a single frequency mode SFD, driving frequencies of the first display area DA1 and the second display area DA2 of the display device DD correspond to the base frequency. For example, the base frequency may be 120 Hz. In the single frequency mode SFD, images of first to 120th frames F1 to F120 may be sequentially displayed in each of the first display area DA1 and the second display area DA2 of the display device DD for one second.

Referring to FIG. 4B, in a multi-frequency mode MFD, the display device DD may set the driving frequency of the first display area DA1, in which the first image IM1 (e.g., the video image) is displayed, to the first driving frequency and may set the driving frequency of the second display area DA2, in which the second image IM2 (e.g., the still image) is displayed, to the second driving frequency lower than the first driving frequency. In an example, the first driving frequency may be 120 Hz, and the second driving frequency may be 1 Hz. The first driving frequency and the second driving frequency may be variously changed. For example, a processor may variously change the first driving frequency and the second driving frequency, example aspects of which are described herein.

In the multi-frequency mode MFD, when the first driving frequency is 120 Hz and the second driving frequency is 1 Hz, for a temporal period of one second, a data signal corresponding to the first image IM1 may be provided to the first display area DA1 of the display device DD in each of the first frame F1 to the 120th frame F120, and a data signal corresponding to the second image IM2 may be provided to the second display area DA2 in the first frame F1 (e.g., and not for frames different from the first frame F1). That is, for example, because a new data signal is not provided to the second display area DA2 in the second to 120th frames F2 to F120, the second image IM2 that is the same as that displayed in the first frame F1 may be displayed in the second to 120th frames F2 to F120.

An example of the multi-frequency mode MFD in which the first driving frequency is 120 Hz and the second driving frequency is 1 Hz is illustrated in FIG. 4B as an example, but the present disclosure is not limited thereto. The second driving frequency may be variously changed to frequencies lower than the first driving frequency, such as, for example, 60 Hz, 30 Hz, and 10 Hz.

Figure 5:
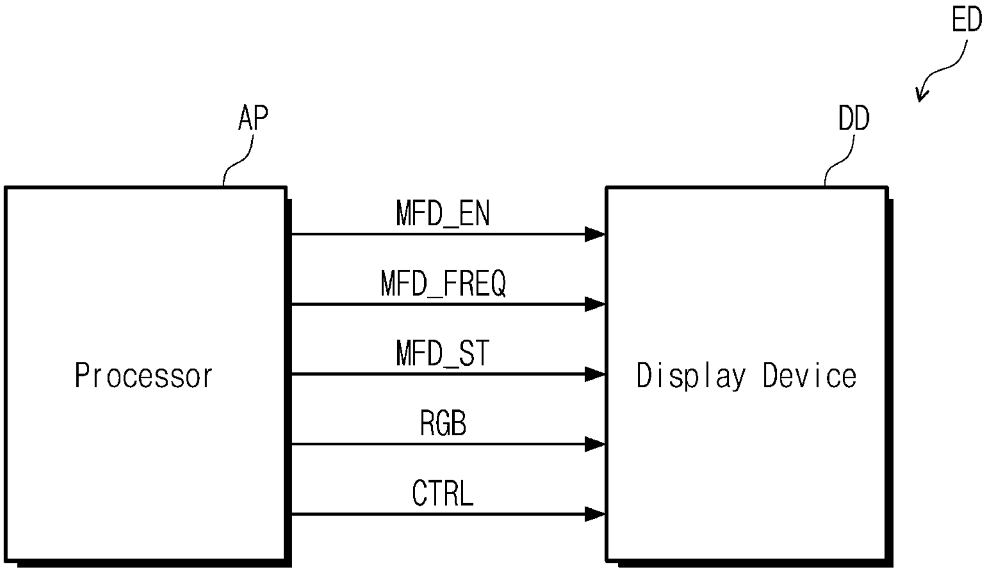
FIG. 5 is a block diagram of an electronic device according to an embodiment of the present disclosure.

FIG. 5 is a block diagram of an electronic device ED according to an embodiment of the present disclosure.

Referring to FIG. 5, the electronic device ED includes a processor AP and the display device DD.

The processor AP may include one of various processors such as, for example, an application processor, a graphics processor, and a main processor. The processor AP may provide various signals to the display device DD such that an image is displayed in the display device DD. The display device DD may display an image in response to the signals provided from the processor AP.

In an embodiment, the signals provided from the processor AP to the display device DD includes a multi-frequency enable signal MFD_EN, a driving frequency signal MFD_FREQ, a start location signal MFD_ST, an image signal RGB, and a control signal CTRL.

The multi-frequency enable signal MFD_EN is a signal indicating whether the display device DD is operating (or is to operate) in the multi-frequency mode. For example, the multi-frequency enable signal MFD_EN may indicate a state (e.g., an active state, an inactive state) of the multi-frequency mode. When the multi-frequency enable signal MFD_EN is at a first level (or an active level), a display area of the display device DD may be divided into at least two display areas, and the display areas may be driven by using different respective frequencies.

The driving frequency signal MFD_FREQ indicates a driving frequency of at least one of the display areas of the display device DD in the multi-frequency mode. In an embodiment, when the display area of the display device DD is divided into a first display area and a second display area, the driving frequency signal MFD_FREQ may indicate a frequency of the second display area. In an embodiment, when the display area of the display device DD is divided into a first display area and a second display area, the driving frequency signal MFD_FREQ may include a frequency of each of the first display area and the second display area. In an embodiment, when the display area of the display device DD is divided into a first display area, a second display area, and a third display area, the driving frequency signal MFD_FREQ may include a frequency of each of the first display area, the second display area, and the third display area.

The start location signal MFD_ST is a signal for distinguishing the display areas of the display device DD in the multi-frequency mode. In an embodiment, when the display area of the display device DD is divided into a first display area and a second display area, the start location signal MFD_ST may indicate a start location of the second display area. In an embodiment, when the display area of the display device DD is divided into a first display area and a second display area, the start location signal MFD_ST may include a start location of each of the first display area and the second display area. In an embodiment, when the display area of the display device DD is divided into a first display area, a second display area, and a third display area, the start location signal MFD_ST may include a start location of each of the second display area and the third display area.

The image signal RGB is a signal corresponding to an image to be displayed in the display device DD.

The control signal CTRL may include signals supportive of the operation of the display device DD, such as, for example, clock signals and synchronization signals.

In an embodiment, the display device DD may operate in the multi-frequency mode in response to the multi-frequency enable signal MFD_EN, the driving frequency signal MFD_FREQ, and the start location signal MFD_ST provided from the processor AP. However, the present disclosure is not limited thereto. In an embodiment, the display device DD may determine an appropriate operation mode (e.g., single frequency mode, multi-frequency mode) based on the image signal RGB and the control signal CTRL and may operate in the operation mode.

Figure 6:
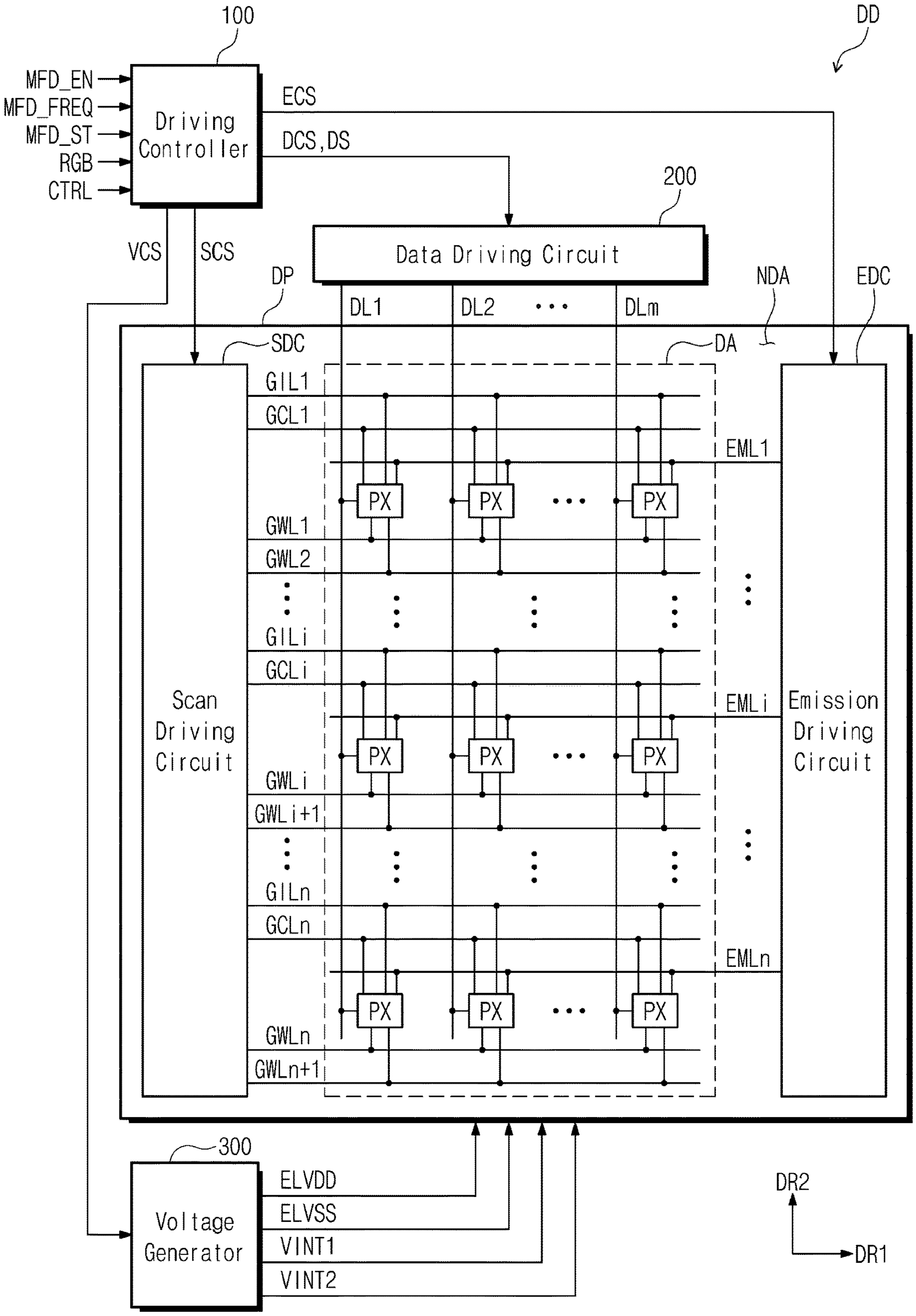
FIG. 6 is a block diagram of a display device according to an embodiment of the present disclosure.

FIG. 6 is a block diagram of a display device according to an embodiment of the present disclosure.

Referring to FIG. 6, the display device DD includes a display panel DP, a driving controller 100, a data driving circuit 200, a voltage generator 300, a scan driving circuit SDC, and an emission driving circuit EDC.

The driving controller 100 may receive the multi-frequency enable signal MFD_EN, the driving frequency signal MFD_FREQ, the start location signal MFD_ST, the image signal RGB, and the control signal CTRL. The driving controller 100 converts and outputs the image signal RGB into an image data signal DS. The driving controller 100 outputs a scan control signal SCS, a data control signal DCS, an emission control signal ECS, and a voltage control signal VCS.

The data driving circuit 200 receives the data control signal DCS and the image data signal DS from the driving controller 100. The data driving circuit 200 converts the image data signal DS into data signals and may output the data signals to a plurality of data lines DL1 to DLm, example aspects of which are later described herein.

The voltage generator 300 generates voltages supportive of the operation of the display panel DP in response to the voltage control signal VCS from the driving controller 100. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, the data lines DL1 to DLm, and pixels PX.

In an embodiment, the scan driving circuit SDC is disposed on a first side of the display panel DP. The scan lines GIL1 to GILn, GCL1 to GCLn, and GWL1 to GWLn+1 extend from the scan driving circuit SDC in the first direction DR1. The emission driving circuit EDC is disposed on a second side of the display panel DP. The emission control lines EML1 to EMLn extend from the emission driving circuit EDC in a direction opposite the first direction DR1.

In an embodiment, the scan driving circuit SDC and the emission driving circuit EDC may be formed in a same process as the pixels PX of the display panel DP. However, the present disclosure is not limited thereto. In some embodiments, each of the scan driving circuit SDC and the emission driving circuit EDC may be implemented as a separate driver chip and may be electrically connected to the display panel DP.

The scan lines GIL1 to GILn, GCL1 to GCLn, and GWL1 to GWLn+1 and the emission control lines EML1 to EMLn are arranged to be spaced from each other in the second direction DR2. The data lines DL1 to DLm extend from the data driving circuit 200 in a direction opposite the second direction DR2 and are arranged to be spaced from each other in the first direction DR1.

In an example illustrated in FIG. 6, the scan driving circuit SDC and the emission driving circuit EDC are arranged such that the scan driving circuit SDC and the emission driving circuit EDC face each other, with the pixels PX interposed therebetween. However, the present disclosure is not limited thereto. For example, the scan driving circuit SDC and the emission driving circuit EDC may be disposed adjacent to the non-display area NDA of the display panel DP (e.g., disposed outside the non-display area NDA). In an embodiment, the scan driving circuit SDC and the emission driving circuit EDC may be implemented in a single circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as illustrated in FIG. 6, the pixels PX belonging to the first row may be connected to the scan lines GIL1, GCL1, GWL1, and GWL2 and the emission control line EML1. The pixels PX belonging to the i-th row may be connected to the scan lines GILi, GCLi, GWLi, and GWLi+1 and the emission control line EMLi. The pixels PX belonging to the n-th row may be connected to the scan lines GILn, GCLn, GWLn, and GWLn+1 and the emission control line EMLn.

Each of the plurality of pixels PX includes a light emitting element ED (refer to FIG. 7) and a pixel circuit PXC (refer to FIG. 7) controlling the emission of the light emitting element ED. The pixel circuit PXC may include one or more transistors and one or more capacitors. The scan driving circuit SDC and the emission driving circuit EDC may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100. The scan driving circuit SDC may output scan signals to the scan lines GIL1 to GILn, GCL1 to GCLn, and GWL1 to GWLn+1 in response to the scan control signal SCS.

The driving controller 100 according to an embodiment may determine the operation mode based on the multi-frequency enable signal MFD_EN. In an embodiment, the driving controller 100 may determine the operation mode based on the multi-frequency enable signal MFD_EN. For example, the driving controller 100 may set the multi-frequency mode or the single frequency mode as the operation mode based on the multi-frequency enable signal MFD_EN. For example, when the multi-frequency enable signal MFD_EN is at the first level (or the active level), the driving controller 100 may select the multi-frequency mode as the operation mode. In another example, when the multi-frequency enable signal MFD_EN is at a second level (or an inactive level), the driving controller 100 may select the single frequency mode as the operation mode. In some embodiments, the first level (or active level) and the second level (or inactive level) may be respective voltage levels associated with selecting the multi-frequency mode as the operation mode (i.e., activating the multi-frequency mode) and selecting the single frequency mode as the operation mode (i.e., activating the single frequency mode).

The driving controller 100 may determine a driving frequency of each of a plurality of areas (e.g., the first display area DA1 (refer to FIGS. 1 through 4B) and the second display area DA2 (refer to FIGS. 1 through 4B)) of the display panel DP.

Figure 8A:
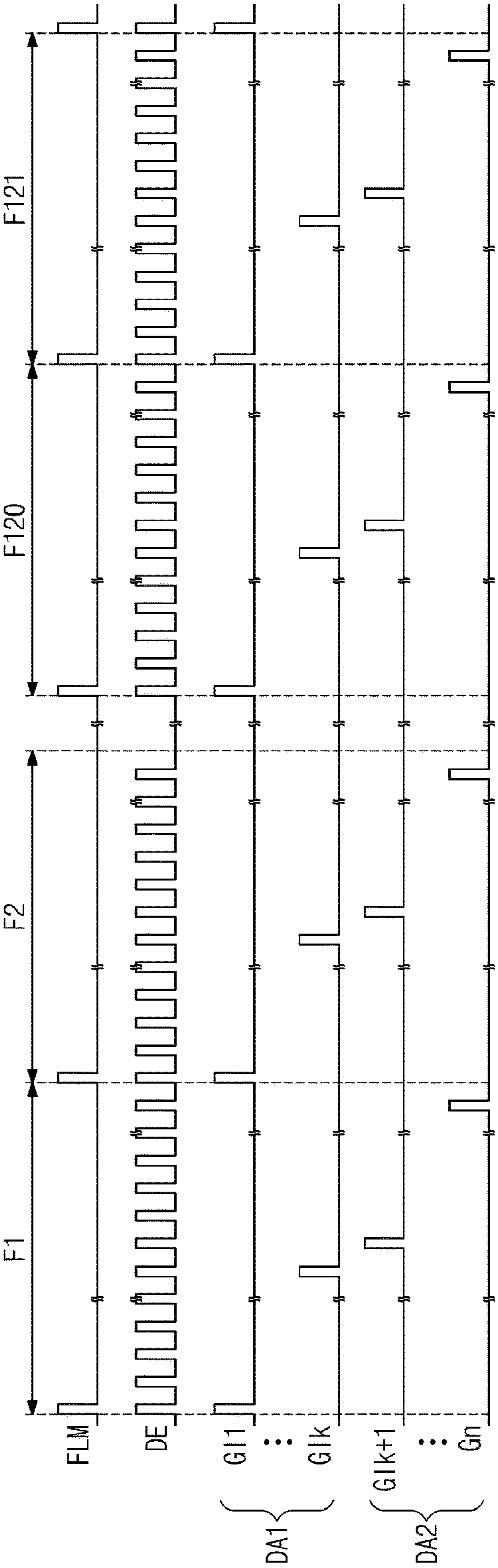
FIG. 8A is a timing diagram illustrating signals used in a display device when an operating mode is a single frequency mode.

In an embodiment, when the single frequency mode is selected as the operation mode, as illustrated in FIG. 8A, the driving controller 100 drives both the first display area DA1 and the second display area DA2 by using the base frequency (e.g., 120 Hz).

When the multi-frequency mode is selected as the operation mode, the driving controller 100 may divide the display area of the display panel DP into the first display area DA1 and the second display area DA2 and may set a driving frequency of each of the first display area DA1 and the second display area DA2. For example, in the multi-frequency mode, the driving controller 100 may drive the first display area DA1 by using the first driving frequency (e.g., 120 Hz) and may drive the second display area DA2 by using the second driving frequency (e.g., 1 Hz). The operation of the driving controller 100 will be described in detail later.

Figure 7:
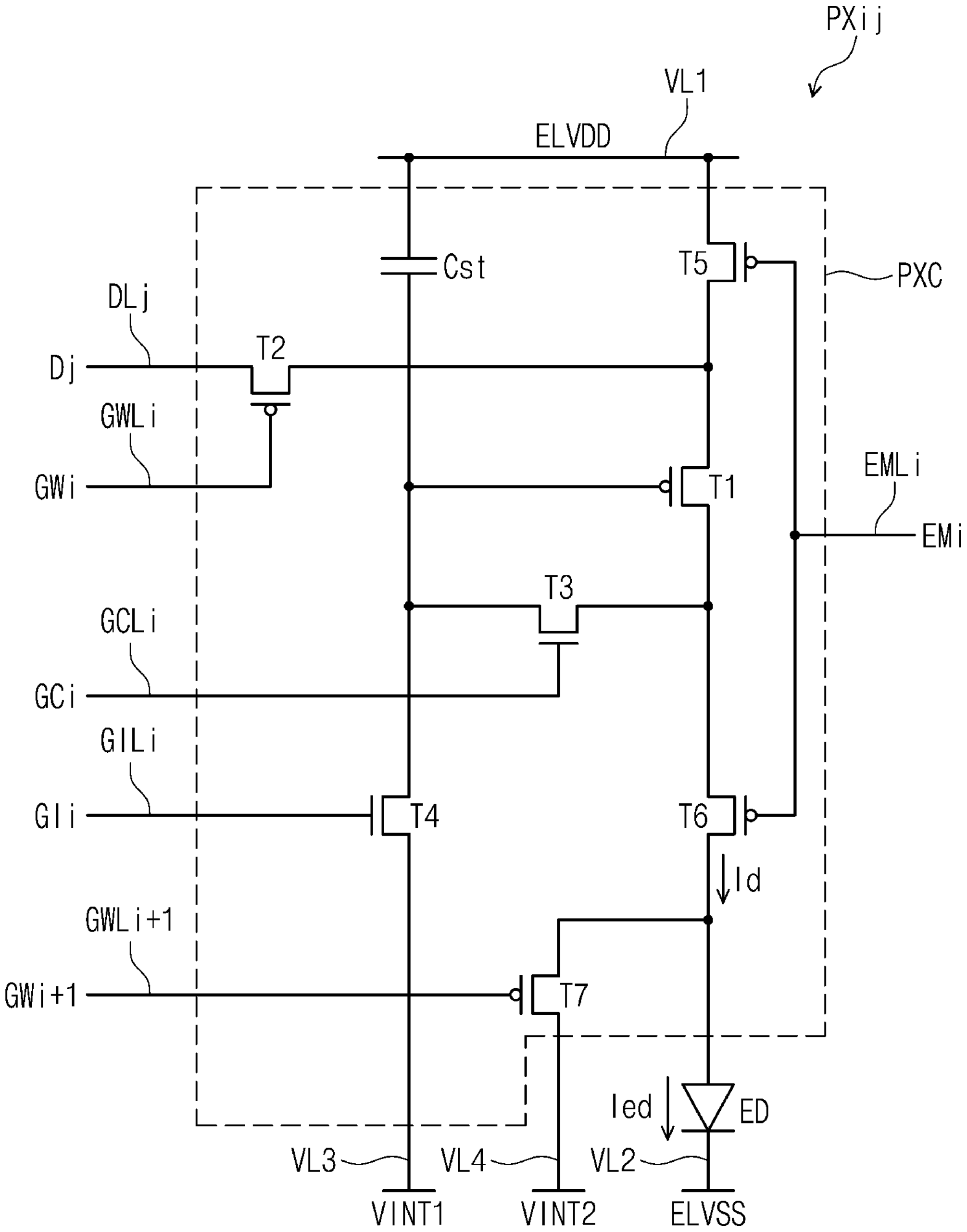
FIG. 7 is a circuit diagram of a pixel according to an embodiment of the present disclosure.

FIG. 7 is a circuit diagram of a pixel according to an embodiment of the present disclosure.

An equivalent circuit diagram of a pixel PXij that is connected to the j-th data line DLj among the data lines DL1 to DLm (refer to FIG. 6), the i-th scan lines GILi, GCLi, and GWLi and the (i+1)-th scan line GWLi+1 among the scan lines GIL1 to GILn, GCL1 to GCLn, and GWL1 to GWLn+1 (refer to FIG. 6), and the i-th emission control line EMLi among the emission control lines EML1 to EMLn (refer to FIG. 6) is illustrated in FIG. 7 as an example.

Each of the plurality of pixels PX illustrated in FIG. 6 may have the same circuit configuration as the equivalent circuit diagram of the pixel PXij illustrated in FIG. 7.

Referring to FIG. 7, the pixel PXij according to an embodiment includes the pixel circuit PXC and at least one light emitting element ED. In an embodiment, the light emitting element ED may be a light emitting diode. In an embodiment, an example in which one pixel PXij includes one light emitting element ED will be described. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors that use an oxide semiconductor as a semiconductor layer, and each of the first, second, fifth, sixth, and seventh transistors T1, T2, T5, T6, and T7 is a P-type transistor having a low-temperature polycrystalline silicon (LTPS) semiconductor layer. However, the present disclosure is not limited thereto. For example, all of the first to seventh transistors T1 to T7 may be P-type transistors or N-type transistors. In an embodiment, at least one of the first to seventh transistors T1 to T7 may be an N-type transistor, and the remaining transistors may be P-type transistors. The pixel circuit configuration according to the present disclosure is not limited to the example of FIG. 7. The pixel circuit PXC illustrated in FIG. 7 is provided as an example, and the configuration of the pixel circuit PXC may be modified and implemented.

The scan lines GILi, GCLi, GWLi, and GWLi+1 may respectively transfer scan signals Gli, GCi, GWi, and GWi+1, and the emission line EMLi may transfer an emission control signal EMi. The data line DLj transfers a data signal Dj. The data signal Dj may have a voltage level corresponding to the image signal RGB input to the display device DD (refer to FIG. 6). First to fourth driving voltage lines VL1, VL2, VL3, and VLA may respectively transfer the first driving voltage ELVDD, the second driving voltage ELVSS, the first initialization voltage VINT1, and the second initialization voltage VINT2.

The first transistor T1 includes a first electrode connected to the first driving voltage line VL1 through the fifth transistor T5, a second electrode electrically connected to an anode of the light emitting element ED through the sixth transistor T6, and a gate electrode connected to a first end of the capacitor Cst. The first transistor T1 may receive the data signal Dj transferred through the data line DLj depending on a switching operation of the second transistor T2 (e.g., based on on-states or off-states of the second transistor T2) and may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on depending on the scan signal GWi transferred through the scan line GWLi and may transfer the data signal Dj from the data line DLj to the first electrode of the first transistor T1.

The third transistor T3 includes a first electrode connected to the gate electrode of the first transistor T1, a second electrode connected to the second electrode of the first transistor T1, and a gate electrode connected to the scan line GCLi. The third transistor T3 may be turned on depending on the scan signal GCi transferred through the scan line GCLi, and thus, the gate electrode and the second electrode of the first transistor T1 may be connected to each other, That is, for example, the first transistor T1 may be diode-connected.

The fourth transistor T4 includes a first electrode connected to the gate electrode of the first transistor T1, a second electrode connected to the third driving voltage line VL3 through which the first initialization voltage VINT1 is transferred, and a gate electrode connected to the scan line GILi. The fourth transistor T4 may be turned on depending on the scan signal Gli transferred through the scan line GILi, and thus, the first initialization voltage VINT1 may be transferred to the gate electrode of the first transistor T1. As such, a voltage of the gate electrode of the first transistor T1 may be initialized. The operation of initializing the gate electrode of the first transistor T1 may be referred to as an "initialization operation".

The fifth transistor T5 includes a first electrode connected to the first driving voltage line VL1, a second electrode connected to the first electrode of the first transistor T1, and a gate electrode connected to the emission control line EMLi.

The sixth transistor T6 includes a first electrode connected to the second electrode of the first transistor T1, a second electrode connected to the anode of the light emitting element ED, and a gate electrode connected to the emission control line EMLi.

The fifth transistor T5 and the sixth transistor T6 may be simultaneously turned on based on the emission control signal EMi transferred through the emission control line EMLi, and thus, the first driving voltage ELVDD may be compensated for through the diode-connected transistor T1 so as to be supplied to the light emitting element ED.

The seventh transistor T7 includes a first electrode connected with the second electrode of the sixth transistor T6, a second electrode connected with the fourth driving voltage line VLA, and a gate electrode connected with the scan line GWLi+1. The seventh transistor T7 is turned on based on the scan signal GWi+1 transferred through the scan line GWLi+1 and bypasses a current of the anode of the light emitting element ED to the fourth driving voltage line VL4.

The first end of the capacitor Cst is connected to the gate electrode of the first transistor T1 as described herein, and a second end of the capacitor Cst is connected to the first driving voltage line VL1. A cathode of the light emitting element ED may be connected to the second driving voltage line VL2 transferring the second driving voltage ELVSS. Embodiments of the circuit configuration of the pixel PXij are not limited to the example illustrated in FIG. 7. In the pixel PXij, the number of transistors, the number of capacitors, and a connection relationship of the transistors and the capacitors may be variously changed or modified.

Figure 8B:
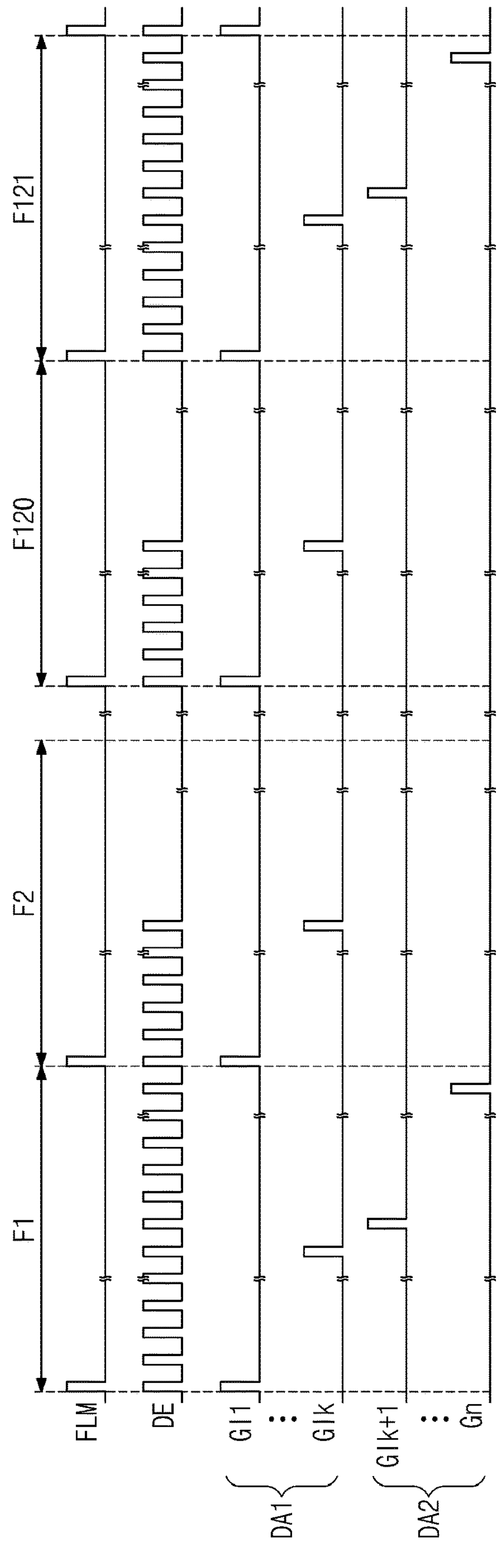
FIG. 8B is a timing diagram illustrating signals used in a display device when an operating mode is a multi-frequency mode.

FIG. 8A is a timing diagram illustrating signals used in the display device DD when the operation mode is the single frequency mode SFD. FIG. 8B is a timing diagram illustrating signals used in the display device DD when the operation mode is the multi-frequency mode MFD.

As illustrated in FIG. 1, the display area DA of the display device DD includes the first display area DA1 and the second display area DA2.

The description is given with reference to FIGS. 8A and 8B under the example assumption that the first display area DA1 illustrated in FIG. 1 corresponds to the scan signals GI1 to GIk and the second display area DA2 illustrated in FIG. 1 corresponds to the scan signals GIk+1 to GIn. The number of scan signals corresponding to the first display area DA1 and the number of scan signals corresponding to the second display area DA2 may be variously changed.

Referring to FIGS. 6, 8A, and 8B, the operation of the driving controller 100 in the display device DD may be classified as a first case where the operation mode is the single frequency mode SFD or a second case where the operation mode is the multi-frequency mode MFD.

(I) In the first case where the operation mode is the single frequency mode SFD, the operation of the display device DD is as follows.

Referring to FIGS. 6 and 8A, the scan control signal SCS that is provided from the driving controller 100 to the scan driving circuit SDC may include a start signal FLM. The start signal FLM may be a signal indicating the start of one frame. The start signal FLM may transition to the active level (e.g. the high level) in each of the first to 120th frames F1, F2, F3, . . . , F120.

The control signal CTRL that the driving controller 100 illustrated in FIG. 6 receives may include a data enable signal DE. The data enable signal DE may be a signal that transitions to the active level for every horizontal line when the valid image signal RGB is received. For example, when the display panel DP includes the pixels PX disposed at 2640 (i.e., n=2640) horizontal lines, in the single frequency mode SFD, the data enable signal DE transitions to the active level 2640 times.

During the single frequency mode SFD, the scan driving circuit SDC may sequentially activate the scan signals GI1 to GIk to the high level in response to the start signal FLM, in each of the first to 121st frames F1, F2, . . . , F120, and F121.

According to the descriptions herein, during the single frequency mode SFD, a frequency of each of the scan signals GI1 to GIk may be the base frequency (e.g., 120 Hz).

(II) In the second case where the operation mode is the multi-frequency mode MFD, the operation of the display device DD is as follows.

Referring to FIGS. 6 and 8B, when the display panel DP includes the pixels PX disposed at 2640 (i.e., n=2640) horizontal lines, in each of the first frame F1 and the 121st frame F121 of the multi-frequency mode MFD, the data enable signal DE transitions to the active level 2640 times.

In each of the second to 120st frames F2, . . . , F120 of the multi-frequency mode MFD, the data enable signal DE is maintained at the inactive level (e.g., the low level) in a horizontal line zone corresponding to the second display area DA2 of the display device DD.

When “k”=1320, in each of the second frame F2 and the third frame F3 of the multi-frequency mode MFD, the data enable signal DE may transition to the active level 1320 times and may then be maintained at the inactive level (e.g., the low level).

In each of the first frame F1 and the 121st frame F121 of the multi-frequency mode MFD, the scan driving circuit SDC may sequentially activate the scan signals GI1 to GIk to the high level in synchronization with the start signal FLM.

In each of the second to 120st frames F2, . . . , F120 of the multi-frequency mode MFD, the scan driving circuit SDC may sequentially activate the scan signals GI1 to GIk to the high level in synchronization with the start signal FLM. In each of the second to 120st frames F2, . . . , F120 of the multi-frequency mode MFD, the scan driving circuit SDC may maintain the scan signals GIk+1 to GIn at the inactive level (or the low level).

According to the example descriptions herein, during the multi-frequency mode MFD, the frequency of each of the scan signals GI1 to GIk may be the first driving frequency (e.g., 120 Hz), and the frequency of each of the scan signals GIk+1 to GIn may be the second driving frequency (e.g., 1 Hz).

Figure 9:
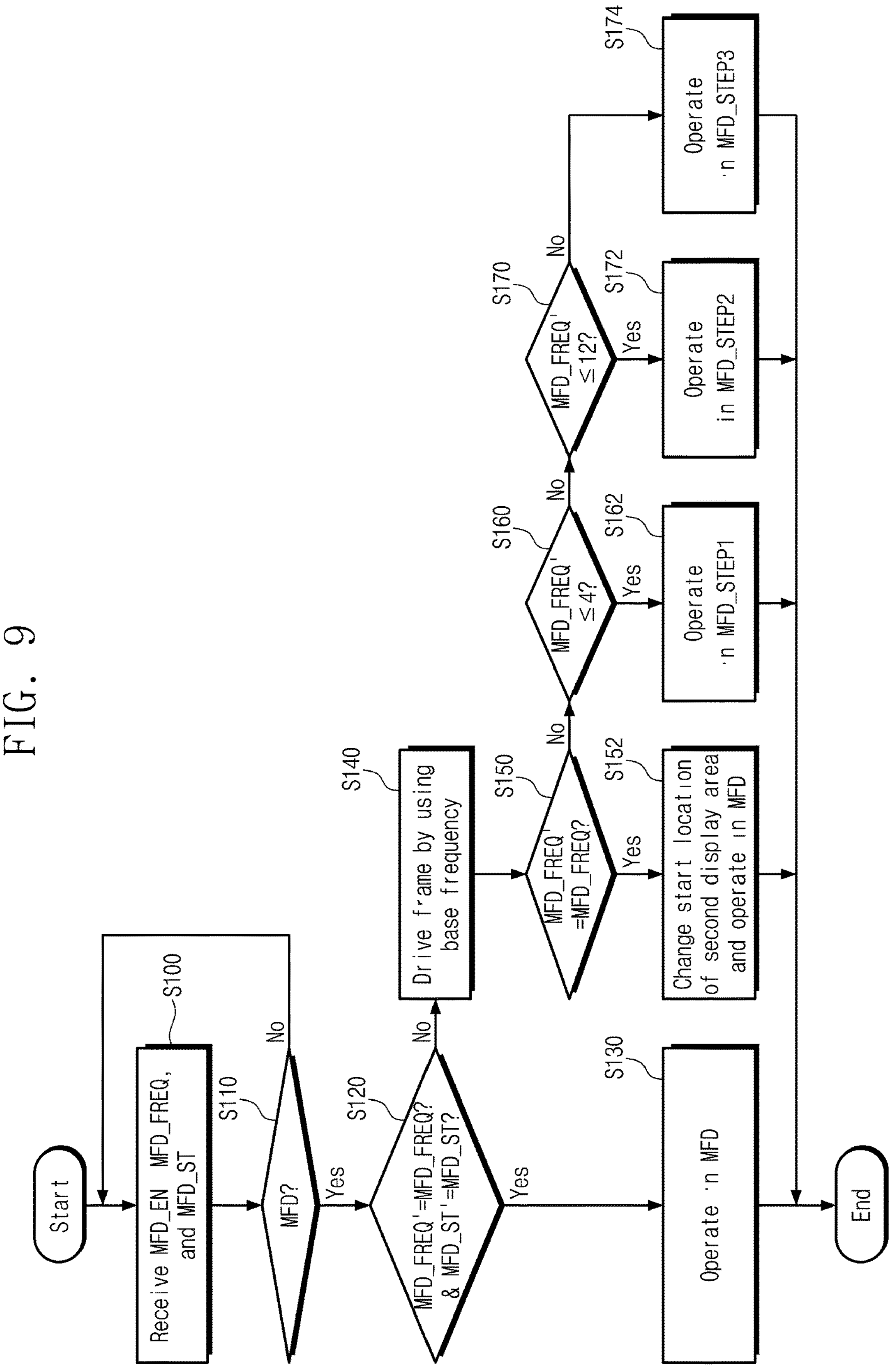
FIG. 9 is a flowchart for describing operations of a driving controller according to an embodiment of the present disclosure.

FIG. 9 is a flowchart for describing operations of the driving controller 100 according to an embodiment of the present disclosure.

Referring to FIGS. 6 and 9, the driving controller 100 receives the multi-frequency enable signal MFD_EN, the driving frequency signal MFD_FREQ, and the start location signal MFD_ST from the processor AP (refer to FIG. 5) (S100). The driving controller 100 may further receive the image signal RGB and the control signal CTRL from the processor AP. The image signal RGB provided from the processor AP may include signals corresponding to the first display area DA1 (refer to FIG. 1) and the second display area DA2 (refer to FIG. 1).

The driving controller 100 determines whether the operation mode is the multi-frequency mode MFD, based on the multi-frequency enable signal MFD_EN (S110).

When the multi-frequency enable signal MFD_EN is at the first level, the driving controller 100 determines that the operation mode is the multi-frequency mode MFD. When the multi-frequency enable signal MFD_EN is at the second level, the driving controller 100 determines that the operation mode is the single frequency mode SFD. When the operation mode is the single frequency mode SFD, the control of the driving controller 100 returns to operation S100.

When the operation mode is the multi-frequency mode MFD, the driving controller 100 compares the driving frequency signal MFD_FREQ of a previous frame and a driving frequency signal MFD_FREQ' of a current frame and compares the start location signal MFD_ST of the previous frame and a start location signal MFD_ST' of the current frame (S120).

When the driving frequency signal MFD_FREQ' of the current frame is the same as the driving frequency signal MFD_FREQ of the previous frame and the start location signal MFD_ST' of the current frame is the same as the start location signal MFD_ST of the previous frame, the driving controller 100 operates in the multi-frequency mode MFD (S130).

That is, for example, when the second driving frequency of the second display area DA2 in the current frame is the same as the second driving frequency of the second display area DA2 in the previous frame and the start location of the second display area DA2 in the current frame is the same as the start location of the second display area DA2 in the previous frame, the driving controller 100 may operate in the multi-frequency mode MFD without switching of the operation mode.

When the driving frequency signal MFD_FREQ' of the current frame is different from the driving frequency signal MFD_FREQ of the previous frame or when the start location signal MFD_ST' of the current frame is different from the start location signal MFD_ST of the previous frame, during one frame, the driving controller 100 operates by using the base frequency (e.g., 120 Hz) (S140). That is, for example, during one frame, the driving controller 100 may drive both the first display area DA1 (refer to FIG. 1) and the second display area DA2 (refer to FIG. 1) by using the base frequency. In an embodiment, during one frame, the driving controller 100 drives both the first display area DA1 and the second display area DA2 by using the base frequency, but the present disclosure is not limited thereto. For example, during at least two frames, the driving controller 100 may drive both the first display area DA1 and the second display area DA2 by using the base frequency.

The driving controller 100 compares the driving frequency signal MFD_FREQ' of the current frame and the driving frequency signal MFD_FREQ of the previous frame (S150).

When it is determined in operation S150 that the driving frequency signal MFD_FREQ' of the current frame is the same as the driving frequency signal MFD_FREQ of the previous frame, the start location signal MFD_ST' of the current frame may be determined as being different from the start location signal MFD_ST of the previous frame. For example, the driving controller 100 may compare the start location signal MFD_ST' of the current frame to the start location signal MFD_ST of the previous frame. When the start location signal MFD_ST' of the current frame is different from the start location signal MFD_ST of the previous frame, the driving controller 100 changes the start location of the second display area DA2 and operates in the multi-frequency mode MFD (S152).

When the driving frequency signal MFD_FREQ' of the current frame is different from the driving frequency signal MFD_FREQ of the previous frame, the driving controller 100 compares the driving frequency signal MFD_FREQ' of the current frame with a first value (e.g., "4") (S160).

When the driving frequency signal MFD_FREQ' of the current frame is smaller than or equal to the first value (e.g., "4"), the driving controller 100 operates in a first step mode MFD_STEP1 (S162).

When the driving frequency signal MFD_FREQ' of the current frame is greater than the first value (e.g., "4"), the driving controller 100 compares the driving frequency signal MFD_FREQ' of the current frame with a second value (e.g., "12") (S170).

When the driving frequency signal MFD_FREQ' of the current frame is smaller than or equal to the second value (e.g., "12") (i.e., when the driving frequency signal MFD_FREQ' of the current frame is greater than the first value (e.g., "4") and is smaller than or equal to the second value (e.g., "12)), the driving controller 100 operates in a second step mode MFD_STEP2 (S172).

When the driving frequency signal MFD_FREQ' of the current frame is greater than the second value (e.g., "12"), the driving controller 100 operates in a third step mode MFD_STEP3 (S174). It is to be understood that descriptions herein of when a condition is met (e.g., when the multi-frequency enable signal MFD_EN is at a first level (or an active level), when the driving frequency signal of a current frame is different from the driving frequency signal of a previous frame, when the start location signal of a current frame is different from the start location signal of a previous frame, and the like described herein, or the like) include a determination by the electronic device ED (e.g., by the display device DD) that the condition has been met and include any combination of decisions or operations performed by electronic device ED associated with the determination.

FIG. 10 is a diagram illustrating operation modes according to the driving frequency signal MFD_FREQ' of the current frame.

Figure 11:
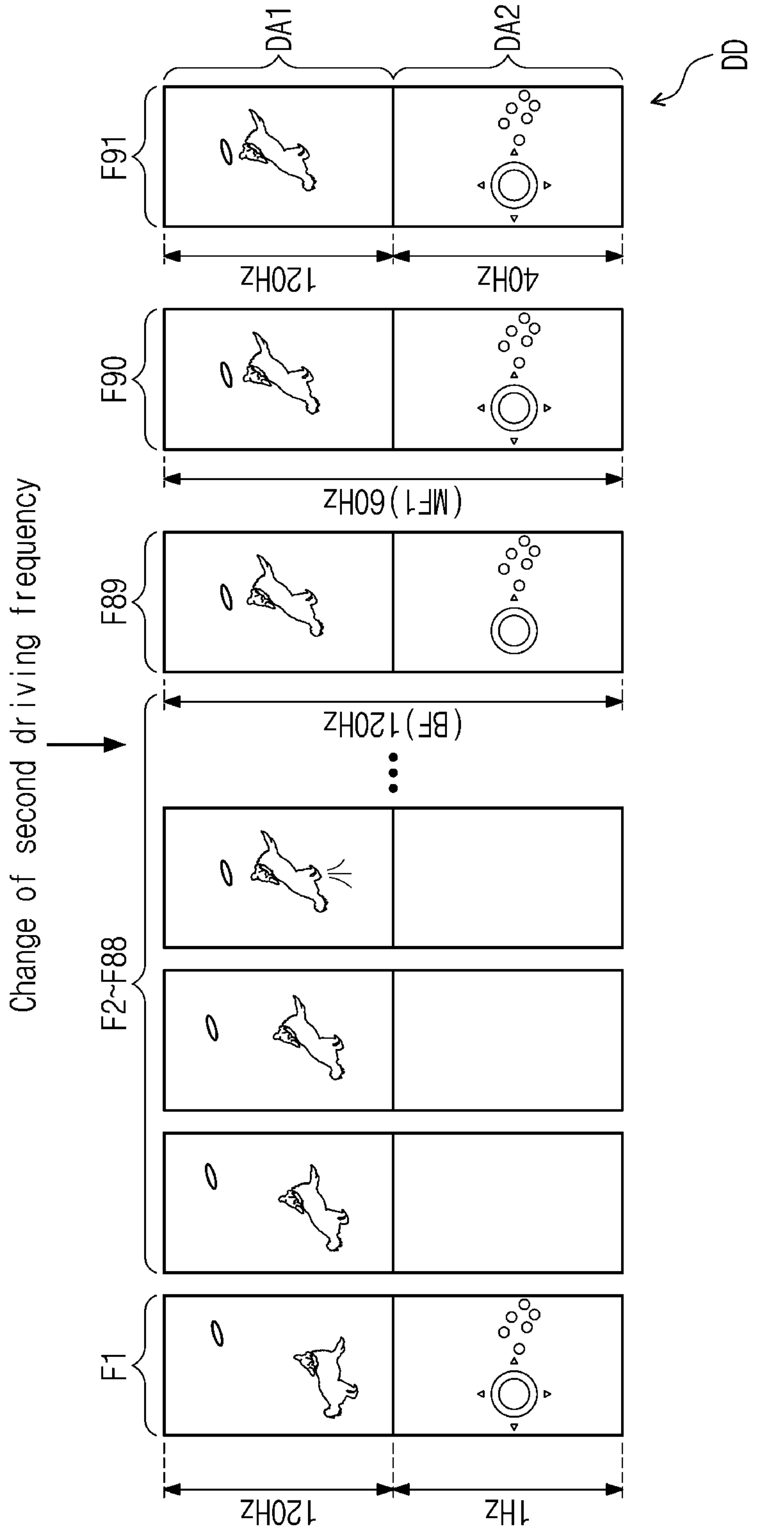
FIGS. 11, 12, and 13 are diagrams illustrating how images are displayed in a display device when a driving frequency changes.
Figure 12:
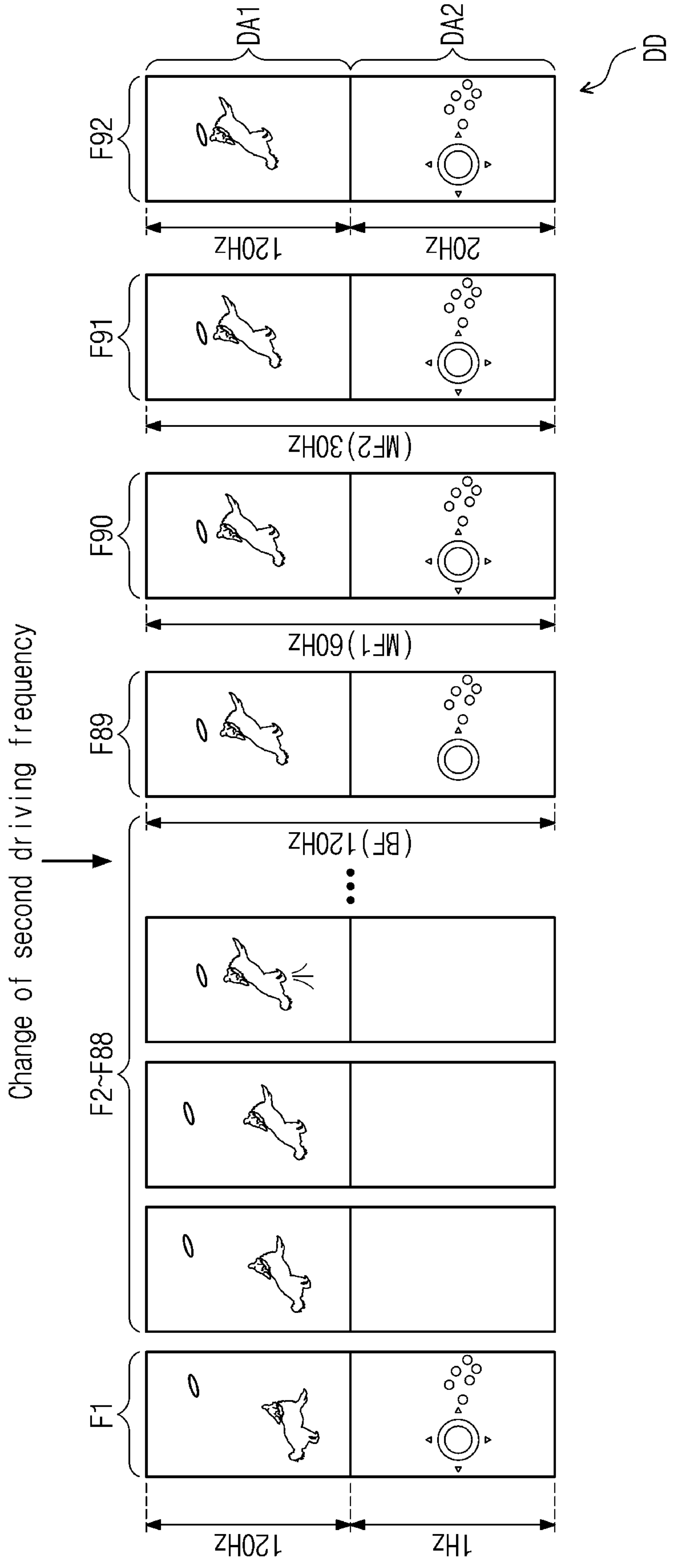
Figure 13:
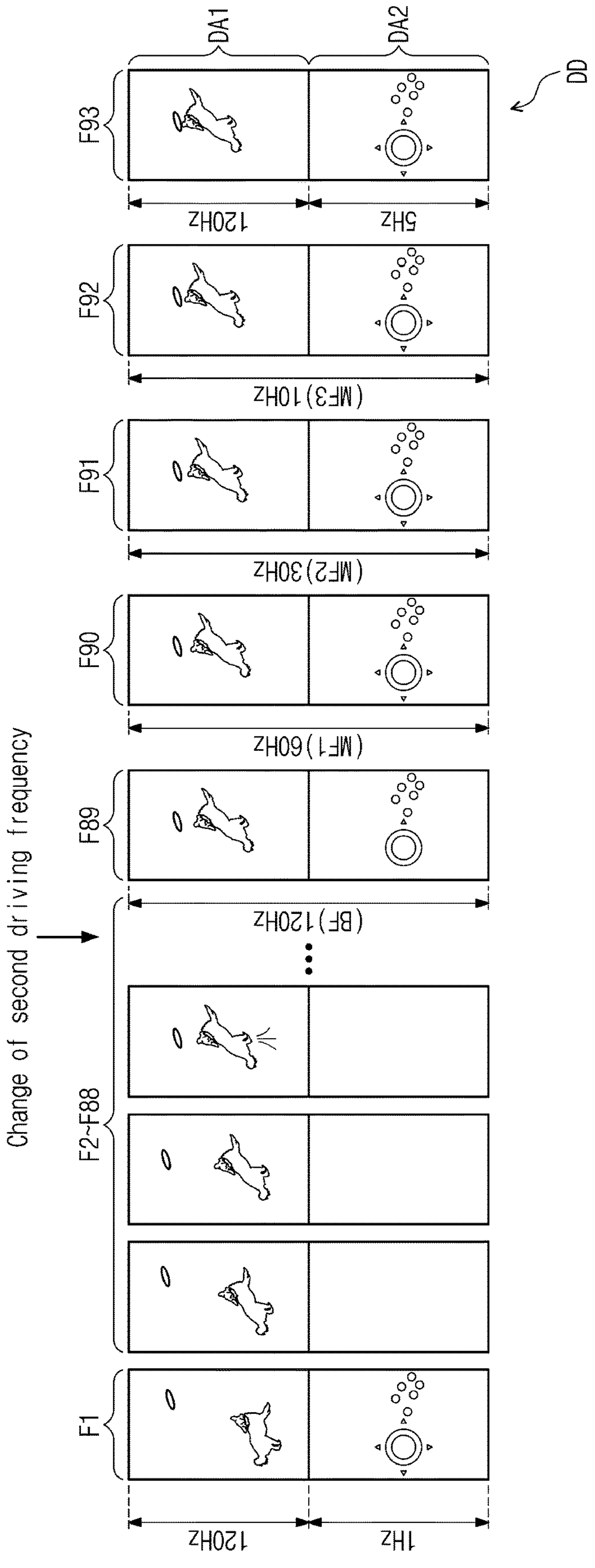

FIGS. 11, 12, and 13 are diagrams illustrating how images are displayed in the display device DD when a driving frequency changes.

Referring to FIG. 10, the driving frequency signal MFD_FREQ' of the current frame may have a value between 0 and 120. For example, a value "0" of the driving frequency signal MFD_FREQ' indicates that a second driving frequency FREQ is 120 Hz, and a value "120" of the driving frequency signal MFD_FREQ' indicates that the second driving frequency FREQ is 1 Hz. When the second driving frequency FREQ of the current frame is 120 Hz, the driving controller 100 may operate in the single frequency mode SFD.

When the second driving frequency FREQ of the current frame changes to one of 60 Hz, 40 Hz, and 30 Hz, the driving controller 100 may operate in the first step mode MFD_STEP1.

In the first step mode MFD_STEP1, during one frame (i.e., during a first intermediate frame), the driving controller 100 drives the first display area DA1 and the second display area DA2 of the display device DD by using a first intermediate frequency MF1 (e.g., 60 Hz).

Next, the driving controller 100 drives the first display area DA1 of the display device DD by using the first driving frequency (e.g., 120 Hz) and drives the second display area DA2 of the display device DD by using the second driving frequency FREQ.

In the example illustrated in FIG. 11, from the first frame F1 to the 88th frame F88, the first display area DA1 of the display device DD is driven by using the first driving frequency (e.g., 120 Hz), and the second display area DA2 thereof is driven by using the second driving frequency (e.g., 1 Hz).

When the second driving frequency FREQ changes from a first frequency to a second frequency, as described with reference to operation S140 of FIG. 9, during one frame, the driving controller 100 drives the display device DD by using a base frequency BF. That is, for example, in the 89th frame F89, both the first display area DA1 and the second display area DA2 of the display device DD may be driven by using the base frequency BF.

Because the second driving frequency FREQ thus changed is 40 Hz, that is, because the driving frequency signal MFD_FREQ' of the current frame is "3", the driving controller 100 operates in the first step mode MFD_STEP1.

In the first step mode MFD_STEP1, during one frame, the driving controller 100 drives the display device DD by using the first intermediate frequency MF1 (e.g., 60 Hz). That is, for example, in the 90th frame F90, both the first display area DA1 and the second display area DA2 of the display device DD may be driven by using the first intermediate frequency MF1.

From the 91st frame F91, the first display area DA1 of the display device DD may be driven by using the first driving frequency (e.g., 120 Hz), and the second display area DA2 of the display device DD may be driven by using 40 Hz as the second driving frequency FREQ.

Returning to FIG. 10, when the second driving frequency FREQ of the current frame is 24 Hz, 20 Hz, 15 Hz, 12 Hz, or 10 Hz, the driving controller 100 may operate in the second step mode MFD_STEP2.

In the second step mode MFD_STEP2, the driving controller 100 drives the first display area DA1 and the second display area DA2 of the display device DD during one frame by using the first intermediate frequency MF1 (e.g., 60 Hz) and drives the first display area DA1 and the second display area DA2 during a next frame (i.e., a second intermediate frame) by using a second intermediate frequency MF2 (e.g., 30 Hz). Next, the driving controller 100 drives the first display area DA1 of the display device DD by using the first driving frequency (e.g., 120 Hz) and drives the second display area DA2 of the display device DD by the second driving frequency FREQ.

In the example illustrated in FIG. 12, from the first frame F1 to the 88th frame F88, the first display area DA1 of the display device DD is driven by using the first driving frequency (e.g., 120 Hz), and the second display area DA2 thereof is driven by using the second driving frequency (e.g., 1 Hz).

When the second driving frequency FREQ changes, as described with reference to operation S140 of FIG. 9, during one frame, the driving controller 100 drives the display device DD by using the base frequency BF. That is, for example, in the 89th frame F89, both the first display area DA1 and the second display area DA2 of the display device DD may be driven by using the base frequency BF.

Because the second driving frequency FREQ thus changed is 20 Hz, that is, because the driving frequency signal MFD_FREQ' of the current frame is "6", the driving controller 100 operates in the second step mode MFD_STEP2.

In the 90th frame F90, both the first display area DA1 and the second display area DA2 of the display device DD are driven by using the first intermediate frequency MF1; in the 91st frame F91, both the first display area DA1 and the second display area DA2 of the display device DD are driven by using the second intermediate frequency MF2.

From the 92nd frame F92, the first display area DA1 of the display device DD may be driven by using the first driving frequency (e.g., 120 Hz), and the second display area DA2 of the display device DD may be driven by using 20 Hz as the second driving frequency FREQ.

When the second driving frequency FREQ of the current frame is 8 Hz, 6 Hz, 5 Hz, 4 Hz, 3 Hz, 2 Hz, or 1 Hz, the driving controller 100 may operate in the third step mode MFD_STEP3.

In the third step mode MFD_STEP3, the driving controller 100 drives the first display area DA1 and the second display area DA2 of the display device DD during one frame by using the first intermediate frequency MF1 (e.g., 60 Hz), then drives the first display area DA1 and the second display area DA2 during a next frame by using the second intermediate frequency MF2 (e.g., 30 Hz), and then drives the first display area DA1 and the second display area DA2 during a next frame by using a third intermediate frequency MF3 (e.g., 10 Hz). Next, the driving controller 100 drives the first display area DA1 of the display device DD by using the first driving frequency (e.g., 120 Hz) and drives the second display area DA2 of the display device DD by using the second driving frequency FREQ. The terms "intermediate frequency" and "medium frequency" may be used interchangeably herein. It is to be understood that the terms "intermediate frequency" and "medium frequency' may include a frequency having a value different from another applied frequency, and the term "medium frequency" is not necessarily limited to being between a medium or halfway value. The terms "intermediate frame" and "medium frame" may be used interchangeably herein.

In the example illustrated in FIG. 13, from the first frame F1 to the 88th frame F88, the first display area DA1 of the display device DD is driven by using the first driving frequency (e.g., 120 Hz), and the second display area DA2 thereof is driven by using the second driving frequency (e.g., 1 Hz).

When the second driving frequency FREQ changes, as described with reference to operation S140 of FIG. 9, during one frame, the driving controller 100 drives the display device DD by using the base frequency BF. That is, for example, in the 89th frame F89, both the first display area DA1 and the second display area DA2 of the display device DD may be driven by using the base frequency BF.

Because the second driving frequency FREQ thus changed is 5 Hz, that is, because the driving frequency signal MFD_FREQ' of the current frame is "24", the driving controller 100 operates in the third step mode MFD_STEP3.

In the 90th frame F90 (i.e., the first intermediate frame), both the first display area DA1 and the second display area DA2 of the display device DD are driven by using the first intermediate frequency MF1; in the 91st frame F91 (i.e., the second intermediate frame), both the first display area DA1 and the second display area DA2 of the display device DD are driven by using the second intermediate frequency MF2; in the 92nd frame F92 (i.e., the third intermediate frame), both the first display area DA1 and the second display area DA2 of the display device DD are driven by using the third intermediate frequency MF3.

From the 93rd frame F93, the first display area DA1 of the display device DD may be driven by using the first driving frequency (e.g., 120 Hz), and the second display area DA2 of the display device DD may be driven by using 5 Hz as the second driving frequency FREQ.

As described herein, when the second driving frequency FREQ corresponding to the second display area DA2 changes while operating in the multi-frequency mode MFD, the first display area DA1 and the second display area DA2 may be driven by using at least one of the first to third medium frequencies MF1, MF2, and MF3 depending on the changed frequency, and thus, the reduction of the quality of display due to a frequency change may be prevented.

In an embodiment, in the multi-frequency mode MFD, the electronic device ED may switch the operation mode to the single frequency mode SFD while the second display area DA2 is driven by using 5 Hz. In this case, the first display area DA1 and the second display area DA2 may be sequentially driven in order of the third intermediate frequency MF3 (e.g., 10 Hz), the second intermediate frequency MF2 (e.g., 30 Hz), the first intermediate frequency MF1 (e.g., 60 Hz), and the base frequency BF (e.g., 120 Hz) every frame.

Figure 14:
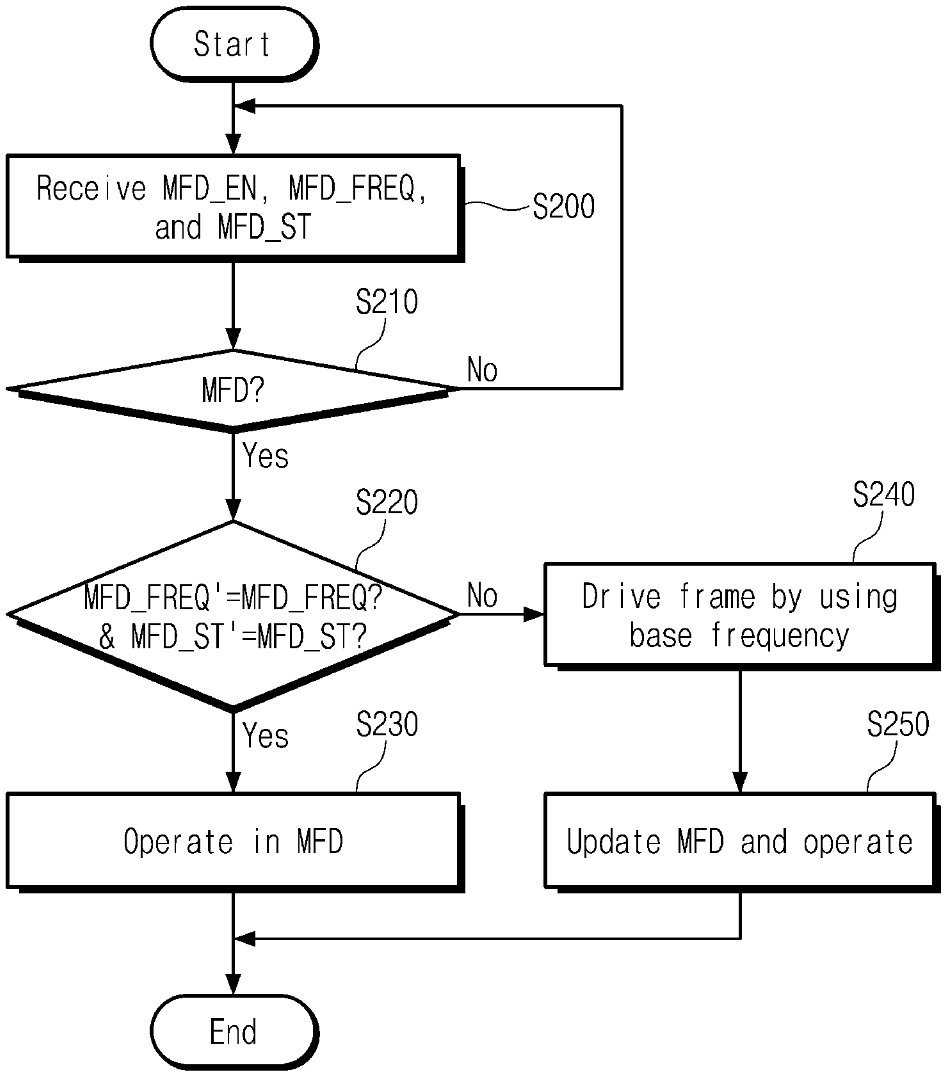
FIG. 14 is a flowchart for describing operations of a driving controller according to an embodiment of the present disclosure.

FIG. 14 is a flowchart for describing operations of the driving controller 100 according to an embodiment of the present disclosure.

Referring to FIGS. 6 and 14, the driving controller 100 receives the multi-frequency enable signal MFD_EN, the driving frequency signal MFD_FREQ, and the start location signal MFD_ST from the processor AP (refer to FIG. 5) (S200).

The driving controller 100 determines whether the operation mode is the multi-frequency mode MFD, based on the multi-frequency enable signal MFD_EN (S210).

When the multi-frequency enable signal MFD_EN is at the first level, the driving controller 100 determines that the operation mode is the multi-frequency mode MFD. When the multi-frequency enable signal MFD_EN is at the second level, the driving controller 100 determines that the operation mode is the single frequency mode SFD. When the operation mode is the single frequency mode SFD, the control of the driving controller 100 returns to operation S200.

When the operation mode is the multi-frequency mode MFD, the driving controller 100 compares the driving frequency signal MFD_FREQ of a previous frame and the driving frequency signal MFD_FREQ' of a current frame and compares the start location signal MFD_ST of the previous frame and the start location signal MFD_ST' of the current frame (S220).

When the driving frequency signal MFD_FREQ' of the current frame is the same as the driving frequency signal MFD_FREQ of the previous frame and the start location signal MFD_ST' of the current frame is the same as the start location signal MFD_ST of the previous frame, the driving controller 100 operates in the multi-frequency mode MFD (S230).

That is, for example, when the second driving frequency of the second display area DA2 in the current frame is the same as the second driving frequency of the second display area DA2 in the previous frame and the start location of the second display area DA2 in the current frame is the same as the start location of the second display area DA2 in the previous frame, the driving controller 100 may operate in the multi-frequency mode MFD without switching of the operation mode.

When the driving frequency signal MFD_FREQ' of the current frame is different from the driving frequency signal MFD_FREQ of the previous frame or when the start location signal MFD_ST' of the current frame is different from the start location signal MFD_ST of the previous frame, during one frame, the driving controller 100 operates by using the base frequency (e.g., 120 Hz) (S240). That is, for example, during one frame, the driving controller 100 may drive both the first display area DA1 (refer to FIG. 1) and the second display area DA2 (refer to FIG. 1) by using the base frequency.

The driving controller 100 updates the second driving frequency FREQ of the second display area DA2 and/or the start location of the second display area DA2 based on the driving frequency signal MFD_FREQ and the start location signal MFD_ST and operates in the updated multi-frequency mode MFD (S250).

Figure 15:
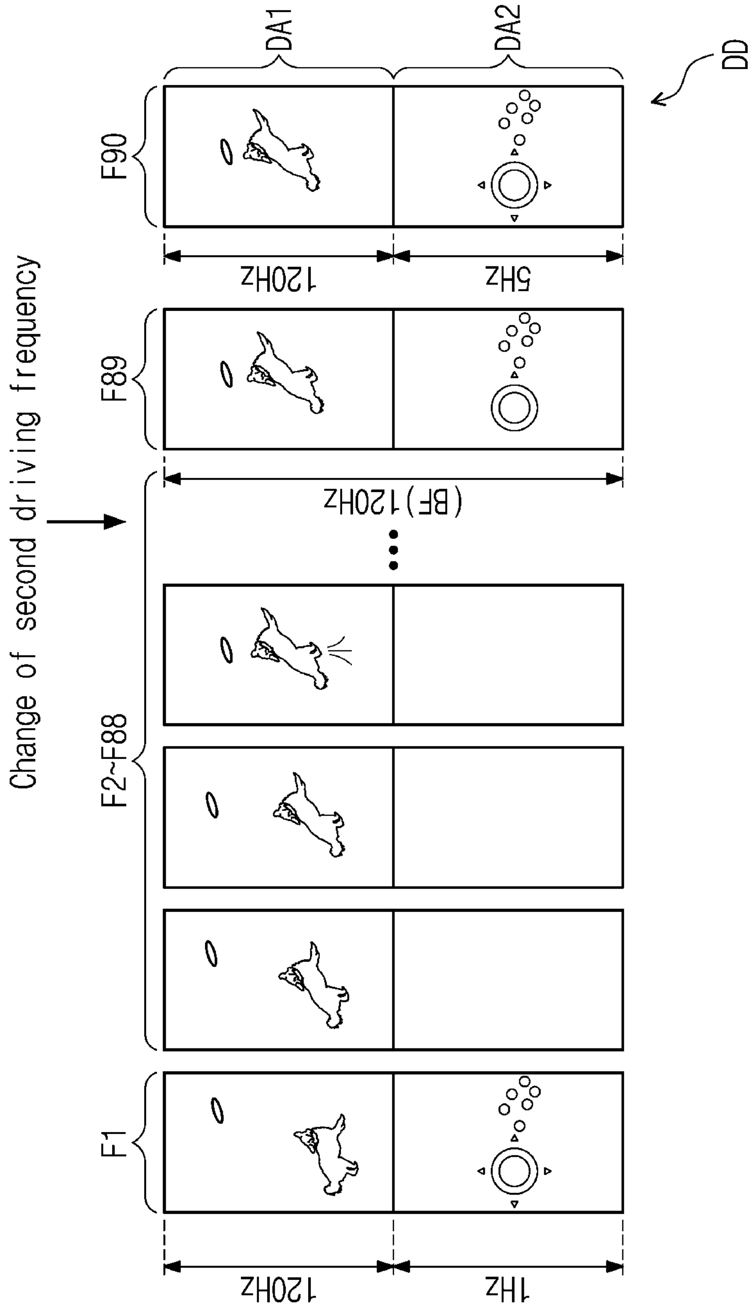
FIG. 15 is a diagram illustrating how images are displayed in a display device when a driving frequency changes.

FIG. 15 is a diagram illustrating how images are displayed in the display device DD when a driving frequency changes.

Referring to FIG. 15, from the first frame F1 to the 88th frame F88, the first display area DA1 of the display device DD is driven by using the first driving frequency (e.g., 120 Hz), and the second display area DA2 thereof is driven by using the second driving frequency (e.g., 1 Hz).

When the second driving frequency FREQ changes, as described with reference to operation S240 of FIG. 14, during one frame, the driving controller 100 drives the display device DD by using the base frequency BF. That is, for example, in the 89th frame F89, both the first display area DA1 and the second display area DA2 of the display device DD may be driven by using the base frequency BF.

When the second driving frequency FREQ thus changed is 5 Hz, that is, when the driving frequency signal MFD_FREQ' of the current frame is “24”, from the 90th frame F90, the first display area DA1 of the display device DD is driven by using the first driving frequency (e.g., 120 Hz), and the second display area DA2 thereof is driven by using 5 Hz as the second driving frequency FREQ.

Figure 16:
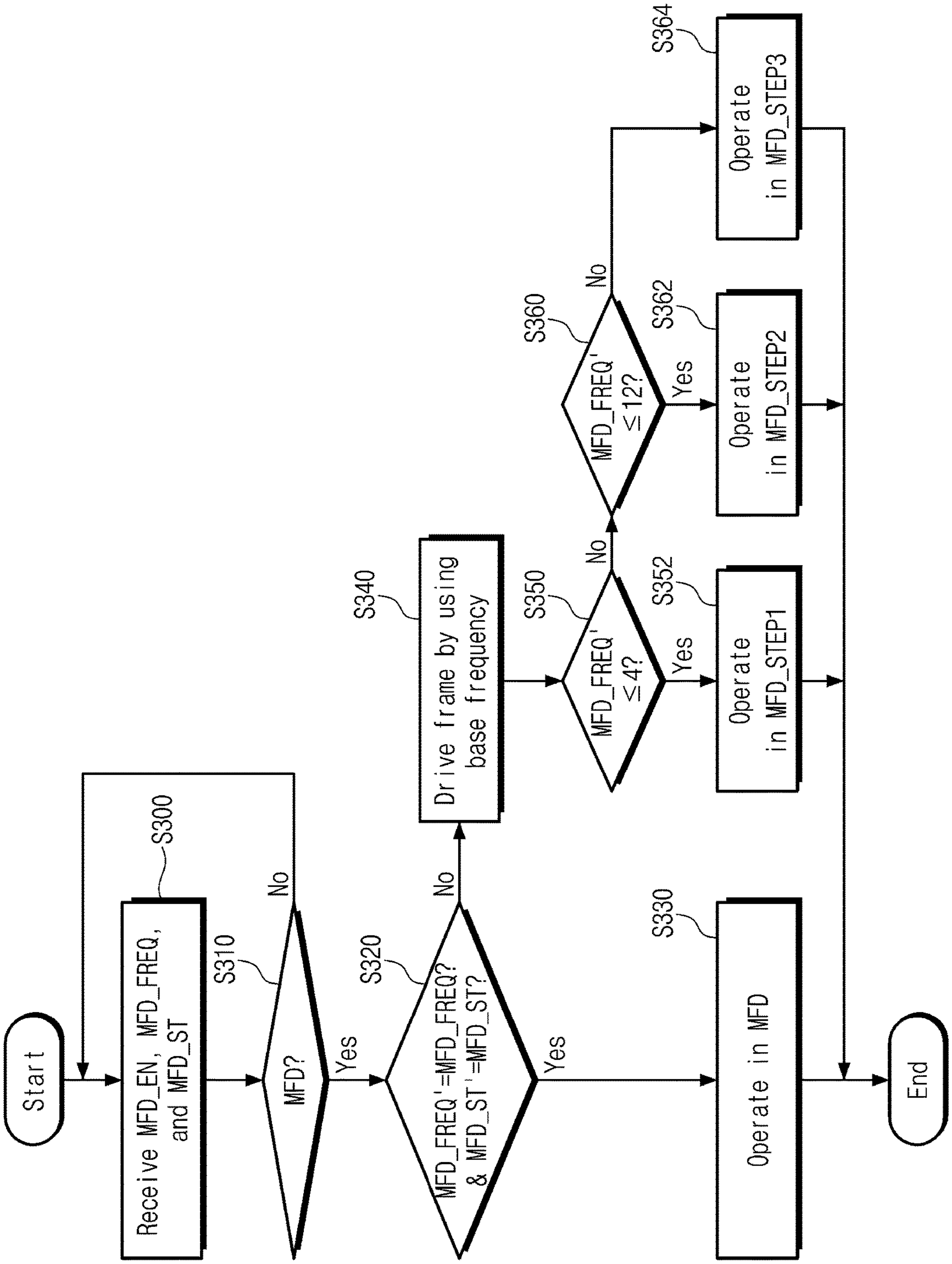
FIG. 16 is a flowchart for describing operations of a driving controller according to an embodiment of the present disclosure.

FIG. 16 is a flowchart for describing operations of the driving controller 100 according to an embodiment of the present disclosure.

Referring to FIGS. 6 and 16, the driving controller 100 receives the multi-frequency enable signal MFD_EN, the driving frequency signal MFD_FREQ, and the start location signal MFD_ST from the processor AP (refer to FIG. 5) (S300).

The driving controller 100 determines whether the operation mode is the multi-frequency mode MFD, based on the multi-frequency enable signal MFD_EN (S310).

When the multi-frequency enable signal MFD_EN is at the first level, the driving controller 100 determines that the operation mode is the multi-frequency mode MFD. When the multi-frequency enable signal MFD_EN is at the second level, the driving controller 100 determines that the operation mode is the single frequency mode SFD. When the operation mode is the single frequency mode SFD, the control of the driving controller 100 returns to operation S300.

When the operation mode is the multi-frequency mode MFD, the driving controller 100 compares the driving frequency signal MFD_FREQ of a previous frame and the driving frequency signal MFD_FREQ' of a current frame and compares the start location signal MFD_ST of the previous frame and the start location signal MFD_ST' of the current frame (S320).

When the driving frequency signal MFD_FREQ' of the current frame is the same as the driving frequency signal MFD_FREQ of the previous frame and the start location signal MFD_ST' of the current frame is the same as the start location signal MFD_ST of the previous frame, the driving controller 100 operates in the multi-frequency mode MFD (S330).

That is, for example, when the second driving frequency of the second display area DA2 in the current frame is the same as the second driving frequency of the second display area DA2 in the previous frame and the start location of the second display area DA2 in the current frame is the same as the start location of the second display area DA2 in the previous frame, the driving controller 100 may operate in the multi-frequency mode MFD without switching of the operation mode.

When the driving frequency signal MFD_FREQ' of the current frame is different from the driving frequency signal MFD_FREQ of the previous frame or when the start location signal MFD_ST' of the current frame is different from the start location signal MFD_ST of the previous frame, during one frame, the driving controller 100 operates by using the base frequency (e.g., 120 Hz) (S340). That is, for example, during one frame, the driving controller 100 may drive both the first display area DA1 (refer to FIG. 1) and the second display area DA2 (refer to FIG. 1) by using the base frequency.

The driving controller 100 compares the driving frequency signal MFD_FREQ' of the current frame with the first value (e.g., "4") (S350).

When the driving frequency signal MFD_FREQ' of the current frame is smaller than or equal to the first value (e.g., "4"), the driving controller 100 operates in the first step mode MFD_STEP1 (S352).

When the driving frequency signal MFD_FREQ' of the current frame is greater than the first value (e.g., "4"), the driving controller 100 compares the driving frequency signal MFD_FREQ' of the current frame with the second value (e.g., "12") (S360).

When the driving frequency signal MFD_FREQ' of the current frame is smaller than or equal to the second value (e.g., "12") (i.e., when the driving frequency signal MFD_FREQ' of the current frame is greater than the first value (e.g., "4") and is smaller than or equal to the second value (e.g., "12)), the driving controller 100 operates in the second step mode MFD_STEP2 (S362).

When the driving frequency signal MFD_FREQ' of the current frame is greater than the second value (e.g., "12"), the driving controller 100 operates in the third step mode MFD_STEP3 (S364).

Operations of the driving controller 100 in the first step mode MFD_STEP1, the second step mode MFD_STEP2, and the third step mode MFD_STEP3 are the same as those described with reference to FIGS. 10, 11, 12, and 13, and thus, additional or repeated descriptions will be omitted to avoid redundancy.

Figure 17:
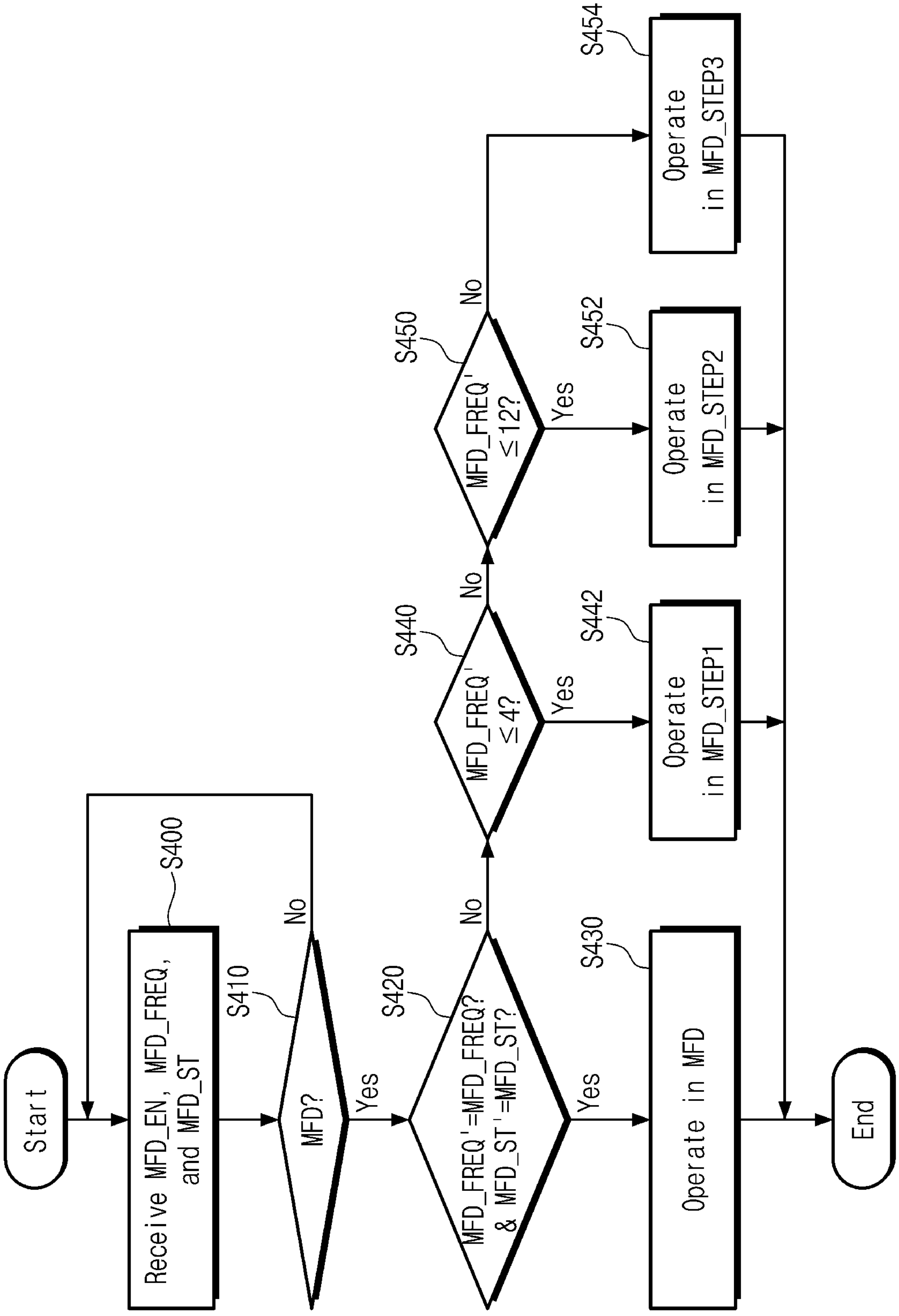
FIG. 17 is a flowchart for describing operations of a driving controller according to an embodiment of the present disclosure.

FIG. 17 is a flowchart for describing operations of the driving controller 100 according to an embodiment of the present disclosure.

Referring to FIGS. 6 and 17, the driving controller 100 receives the multi-frequency enable signal MFD_EN, the driving frequency signal MFD_FREQ, and the start location signal MFD_ST from the processor AP (refer to FIG. 5) (S400).

The driving controller 100 determines whether the operation mode is the multi-frequency mode MFD, based on the multi-frequency enable signal MFD_EN (S410).

When the multi-frequency enable signal MFD_EN is at the first level, the driving controller 100 determines that the operation mode is the multi-frequency mode MFD. When the multi-frequency enable signal MFD_EN is at the second level, the driving controller 100 determines that the operation mode is the single frequency mode SFD. When the operation mode is the single frequency mode SFD, the control of the driving controller 100 returns to operation S400.

When the operation mode is the multi-frequency mode MFD, the driving controller 100 compares the driving frequency signal MFD_FREQ of a previous frame and the driving frequency signal MFD_FREQ' of a current frame and compares the start location signal MFD_ST of the previous frame and the start location signal MFD_ST' of the current frame (S420).

When the driving frequency signal MFD_FREQ' of the current frame is the same as the driving frequency signal MFD_FREQ of the previous frame and the start location signal MFD_ST' of the current frame is the same as the start location signal MFD_ST of the previous frame, the driving controller 100 operates in the multi-frequency mode MFD (S430).

That is, for example, when the second driving frequency of the second display area DA2 in the current frame is the same as the second driving frequency of the second display area DA2 in the previous frame and the start location of the second display area DA2 in the current frame is the same as the start location of the second display area DA2 in the previous frame, the driving controller 100 may operate in the multi-frequency mode MFD without switching of the operation mode.

When the driving frequency signal MFD_FREQ' of the current frame is different from the driving frequency signal MFD_FREQ of the previous frame or when the start location signal MFD_ST' of the current frame is different from the start location signal MFD_ST of the previous frame, the driving controller 100 compares the driving frequency signal MFD_FREQ' of the current frame with the first value (e.g., "4") (S440).

When the driving frequency signal MFD_FREQ' of the current frame is smaller than or equal to the first value (e.g., "4"), the driving controller 100 operates in the first step mode MFD_STEP1 (S442).

When the driving frequency signal MFD_FREQ' of the current frame is greater than the first value (e.g., "4"), the driving controller 100 compares the driving frequency signal MFD_FREQ' of the current frame with the second value (e.g., "12") (S450).

When the driving frequency signal MFD_FREQ' of the current frame is smaller than or equal to the second value (e.g., "12") (i.e., when the driving frequency signal MFD_FREQ' of the current frame is greater than the first value (e.g., "4") and is smaller than or equal to the second value (e.g., "12)), the driving controller 100 operates in the second step mode MFD_STEP2 (S452).

When the driving frequency signal MFD_FREQ' of the current frame is greater than the second value (e.g., "12"), the driving controller 100 operates in the third step mode MFD_STEP3 (S454).

Figure 18:
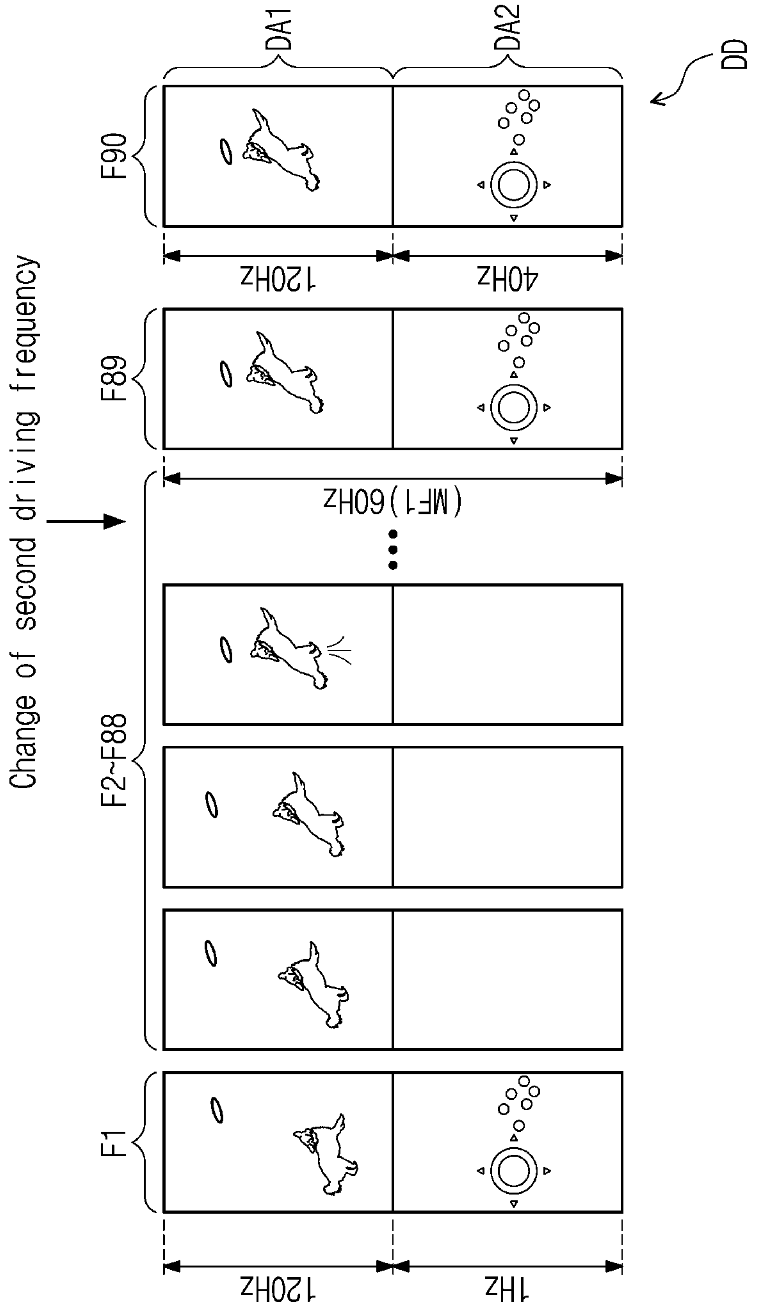
FIG. 18 is a diagram illustrating how images are displayed in a display device when a driving frequency changes.

FIG. 18 is a diagram illustrating how images are displayed in the display device DD when a driving frequency changes.

Referring to FIGS. 6 and 18, from the first frame F1 to the 88th frame F88, the first display area DA1 of the display device DD is driven by using the first driving frequency (e.g., 120 Hz), and the second display area DA2 thereof is driven by using the second driving frequency (e.g., 1 Hz).

When the second driving frequency FREQ changes to one of 60 Hz, 40 Hz, and 30 Hz, the driving controller 100 may operate in the first step mode MFD_STEP1.

In the first step mode MFD_STEP1, during one frame, the driving controller 100 drives the first display area DA1 and the second display area DA2 of the display device DD by using the first intermediate frequency MF1 (e.g., 60 Hz). That is, for example, in the 89th frame F89, both the first display area DA1 and the second display area DA2 of the display device DD may be driven by using the first intermediate frequency MF1.

Afterwards, the driving controller 100 drives the first display area DA1 of the display device DD by using the first driving frequency (e.g., 120 Hz) and drives the second display area DA2 of the display device DD by using the second driving frequency FREQ (e.g., 40 Hz).

According to the above configuration, a display device may operate in a multi-frequency mode in which a first display area is driven by using a first driving frequency and a second display area is driven by using a second driving frequency lower than the first driving frequency. As the driving frequency of the second display area decreases, power consumption of the display device may be reduced.

When the driving frequency of the second display area changes, during one frame, both the first display area and the second display area of the display device are driven by using a base frequency. In some aspects, when the variations in the driving frequency of the second display area are great, driving frequencies of the first display area and the second display area of the display device stepwise decrease. Accordingly, the reduction of the quality of display due to a change in the driving frequency may be prevented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a first display area and a second display area; and a driving controller configured to receive an image signal and a control signal and to output an image data signal to be provided to the display panel, wherein, during a multi-frequency mode, the driving controller drives the first display area by using a first driving frequency and drives the second display area by using a second driving frequency different from the first driving frequency, wherein, during the multi-frequency mode, when the second driving frequency changes from a first frequency to a second frequency, the driving controller is configured to:

drive the first display area and the second display area during at least one frame by using a base frequency;

drive the first display area and the second display area during at least one second frame by using an intermediate frequency between the base frequency and the second frequency; and during at least one third frame, drive the first display area by using the first driving frequency and drive the second display area by using the second frequency.

2. The display device of claim 1, wherein the driving controller receives:

a multi-frequency enable signal indicating the multi-frequency mode, a driving frequency signal indicating a frequency of the second display area for each of a previous frame and a current frame, and a start location signal indicating a start location of the second display area, for each of the previous frame and the current frame.

3. The display device of claim 2, wherein, when the multi-frequency enable signal is at a first level, the driving controller operates in the multi-frequency mode.

4. The display device of claim 2, wherein, when the driving frequency signal of the current frame is different from the driving frequency signal of the previous frame or when the start location signal of the current frame is different from the start location signal of the previous frame, during the at least one frame, the driving controller drives the first display area and the second display area by using the base frequency.

5. The display device of claim 2, wherein, when the driving frequency signal of the current frame is smaller than or equal to a first value, the driving controller is configured to:

drive the first display area and the second display area during a first intermediate frame, by using a first intermediate frequency between the base frequency and the second frequency; and during the at least one third frame, drive the first display area by using the first driving frequency and drive the second display area by using the second frequency.

6. The display device of claim 5, wherein, when the driving frequency signal of the current frame is greater than the first value and is smaller than or equal to a second value, the driving controller is configured to:

drive the first display area and the second display area during the first intermediate frame by using the first intermediate frequency;

drive the first display area and the second display area during a second intermediate frame continuous to the first intermediate frame, by using a second intermediate frequency between the first intermediate frequency and the second frequency; and during the at least one third frame, drive the first display area by using the first driving frequency and drive the second display area by using the second frequency.

7. The display device of claim 6, wherein, when the driving frequency signal of the current frame is greater than a second value greater than the first value, the driving controller is configured to:

drive the first display area and the second display area during the first intermediate frame by using the first intermediate frequency;

drive the first display area and the second display area during the second intermediate frame continuous to the first intermediate frame, by using the second intermediate frequency;

drive the first display area and the second display area during a third intermediate frame continuous to the second intermediate frame, by using a third intermediate frequency between the second intermediate frequency and the second frequency; and during the at least one third frame, drive the first display area by using the first driving frequency and drive the second display area by using the second frequency.

8. The display device of claim 2, wherein, when the driving frequency signal of the current frame is the same as the driving frequency signal of the previous frame and when the start location signal of the current frame is different from the start location signal of the previous frame, during at least one second frame, the driving controller drives the first display area and the second display area by using the base frequency.

9. The display device of claim 1, wherein the first driving frequency is higher than or equal to the base frequency.

10. A method of driving a display device, the method comprising:

receiving an image signal corresponding to a first display area and a second display area of a display panel, a multi-frequency enable signal indicating a multi-frequency mode, a driving frequency signal indicating a frequency of the second display area, and a start location signal indicating a start location of the second display area, for each of a previous frame and a current frame;

while the multi-frequency enable signal indicates the multi-frequency mode, comparing the driving frequency signal of the current frame with the driving frequency signal of the previous frame and comparing the start location signal of the current frame with the start location signal of the previous frame;

based on determining the driving frequency signal of the current frame is different from the driving frequency signal of the previous frame or determining the start location signal of the current frame is different from the start location signal of the previous frame, during at least one frame, driving the first display area and the second display area by using a base frequency; and driving the first display area by using a first driving frequency and driving the second display area by using a second driving frequency corresponding to the driving frequency signal of the current frame.

11. The method of claim 10, further comprising:

when the driving frequency signal of the current frame is different from the driving frequency signal of the previous frame, comparing the driving frequency signal of the current frame with a first value; and when the driving frequency signal of the current frame is smaller than or equal to the first value, driving the display panel, and wherein the driving of the display panel when the driving frequency signal of the current frame is smaller than or equal to the first value includes:

driving the first display area and the second display area by using a first intermediate frequency between the base frequency and the second driving frequency; and driving the first display area by using the first driving frequency and driving the second display area by the second driving frequency.

12. The method of claim 11, further comprising:

comparing the driving frequency signal of the current frame with a second value greater than the first value; and when the driving frequency signal of the current frame is smaller than or equal to the second value, driving the display panel, and wherein the driving of the display panel when the driving frequency signal of the current frame is smaller than or equal to the second value includes:

driving the first display area and the second display area by using the first intermediate frequency;

driving the first display area and the second display area by using a second intermediate frequency between the first intermediate frequency and the second driving frequency; and driving the first display area by using the first driving frequency and driving the second display area by the second driving frequency.

13. The method of claim 12, further comprising:

comparing the driving frequency signal of the current frame with a second value greater than the first value; and when the driving frequency signal of the current frame is greater than the second value, driving the display panel, and wherein the driving of the display panel when the driving frequency signal of the current frame is greater than the second value includes:

driving the first display area and the second display area by using the first intermediate frequency during a first intermediate frame;

driving the first display area and the second display area by using the second intermediate frequency during a second intermediate frame continuous to the first intermediate frame;

driving the first display area and the second display area during a third intermediate frame continuous to the second intermediate frame, by using a third intermediate frequency between the second intermediate frequency and the second driving frequency; and driving the first display area by using the first driving frequency and driving the second display area by the second driving frequency.

14. The method of claim 10, further comprising:

when the driving frequency signal of the current frame is the same as the driving frequency signal of the previous frame and when the start location signal of the current frame is different from the start location signal of the previous frame, driving the first display area and the second display area during at least one second frame by using the base frequency.

15. The method of claim 10, wherein the second driving frequency is lower than the first driving frequency.

16. The method of claim 10, wherein the first driving frequency is higher than or equal to the base frequency.

17. An electronic device comprising:

a processor configured to provide an image signal, a multi-frequency enable signal, and a driving frequency signal; and a display device configured to receive the image signal, the multi-frequency enable signal, and the driving frequency signal and to display an image, wherein the display device includes:

a display panel including a first display area and a second display area; and a driving controller configured to receive the image signal, the multi-frequency enable signal, and the driving frequency signal and to output an image data signal to be provided to the display panel, wherein, during a multi-frequency mode, the driving controller drives the first display area by using a first driving frequency and drives the second display area by using a second driving frequency different from the first driving frequency, wherein, while the multi-frequency enable signal indicates the multi-frequency mode, when the second driving frequency corresponding to the driving frequency signal changes from a first frequency to a second frequency, the driving controller is configured to:

drive the first display area and the second display area during at least one frame by using a base frequency;

then drive the first display area and the second display area during at least one second frame by using an intermediate frequency between the base frequency and the second frequency; and during at least one third frame, drive the first display area by using the first driving frequency and drive the second display area by using the second frequency.

18. The electronic device of claim 17, wherein, when the driving frequency signal of a current frame is smaller than or equal to a first value, the driving controller is configured to:

drive the first display area and the second display area during a first intermediate frame by using a first intermediate frequency between the base frequency and the second frequency; and during the at least one third frame, drive the first display area by using the first driving frequency and drive the second display area by using the second frequency.

19. The electronic device of claim 18, wherein, when the driving frequency signal of the current frame is greater than the first value and is smaller than or equal to a second value, the driving controller is configured to:

drive the first display area and the second display area during the first intermediate frame by using the first intermediate frequency;

drive the first display area and the second display area during a second intermediate frame continuous to the first intermediate frame, by using a second intermediate frequency between the first intermediate frequency and the second frequency; and during the at least one third frame, drive the first display area by using the first driving frequency and drive the second display area by using the second frequency.

20. The electronic device of claim 17, wherein the processor provides the driving frequency signal for each of a previous frame and a current frame, and wherein the processor further provides a start location signal for each of the previous frame and the current frame, and wherein, when the driving frequency signal of the current frame is the same as the driving frequency signal of the previous frame and when the start location signal of the current frame is different from the start location signal of the previous frame, the driving controller drives the first display area and the second display area during at least one second frame by using the base frequency.

21. An electronic device comprising:

a processor configured to provide an image signal, a multi-frequency enable signal, a driving frequency signal, and a start location signal; and a display device configured to receive the image signal, the multi-frequency enable signal, the driving frequency signal, and the start location signal and to display an image, wherein the display device includes:

a display panel; and a driving controller configured to divide and drive the display panel into a first display area and a second display area in response to the start location signal while the multi-frequency enable signal indicates a multi-frequency mode, wherein the start location signal indicates a start location of the second display area of the display panel, and wherein, in response to the driving frequency signal, the driving controller drives the first display area by using a first driving frequency and drives the second display area by using a second driving frequency different from the first driving frequency.

22. The electronic device of claim 21, wherein, while the multi-frequency enable signal indicates the multi-frequency mode, when the second driving frequency corresponding to the driving frequency signal changes from a first frequency to a second frequency, the driving controller is configured to:

drive the first display area and the second display area during at least one frame by using a base frequency;

then drive the first display area and the second display area during at least one frame by using a medium frequency between the base frequency and the second frequency; and then drive the first display area by using the first driving frequency and the second display area by using the second frequency.

23. The electronic device of claim 22, wherein, when the driving frequency signal of a current frame is smaller than or equal to a first value, the driving controller is configured to:

drive the first display area and the second display area during a first medium frame by using a first medium frequency between the base frequency and the second frequency; and then drive the first display area by using the first driving frequency and the second display area by using the second frequency.

24. The electronic device of claim 23, wherein, when the driving frequency signal of the current frame is greater than the first value and is smaller than or equal to a second value, the driving controller is configured to:

drive the first display area and the second display area during the first medium frame by using the first medium frequency;

then drive the first display area and the second display area during a second medium frame continuous to the first medium frame, by using a second medium frequency between the first medium frequency and the second frequency; and then drive the first display area by using the first driving frequency and the second display area by using the second frequency.

25. The electronic device of claim 21, wherein, when the driving frequency signal of a current frame is the same as the driving frequency signal of a previous frame and when the start location signal of the current frame is different from the start location signal of the previous frame, the driving controller drives the first display area and the second display area during at least one frame by using a base frequency.

* * * * *